(12) United States Patent
Roh

(10) Patent No.: US 12,261,314 B2
(45) Date of Patent: Mar. 25, 2025

(54) BATTERY PACK AND MANUFACTURING METHOD THEREOF

(71) Applicant: LG ENERGY SOLUTION, LTD., Seoul (KR)

(72) Inventor: Taehwan Roh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 719 days.

(21) Appl. No.: 17/615,269

(22) PCT Filed: Jun. 29, 2020

(86) PCT No.: PCT/KR2020/008430
§ 371 (c)(1),
(2) Date: Nov. 30, 2021

(87) PCT Pub. No.: WO2021/075665
PCT Pub. Date: Apr. 22, 2021

(65) Prior Publication Data
US 2022/0223965 A1 Jul. 14, 2022

(30) Foreign Application Priority Data

Oct. 14, 2019 (KR) .................. 10-2019-0127009

(51) Int. Cl.
*H01M 50/244* (2021.01)
*H01M 10/613* (2014.01)
(Continued)

(52) U.S. Cl.
CPC ..... *H01M 50/244* (2021.01); *H01M 10/6556* (2015.04); *H01M 10/6568* (2015.04);
(Continued)

(58) Field of Classification Search
CPC .......... H01M 50/244; H01M 10/6556; H01M 10/6568; H01M 10/625; H01M 10/647;
(Continued)

(56) References Cited

U.S. PATENT DOCUMENTS 7,648,538 B2  1/2010  Oogami et al.
9,083,029 B2  7/2015  Lee et al.
(Continued)

FOREIGN PATENT DOCUMENTS

CN  207311083 U  5/2018
CN  207637859 U  7/2018
(Continued)

OTHER PUBLICATIONS

Shi, CN 207311083 Espacenet machine translation, 2018 (Year: 2018).*

(Continued)

*Primary Examiner* — Adam A Arciero
(74) *Attorney, Agent, or Firm* — Birch, Stewart, Kolasch & Birch, LLP

(57) ABSTRACT

Discussed is a battery pack having a simplified structure and a method for manufacturing the same. The battery pack includes: an upper case and a lower case; a battery module stack in which battery modules are stacked between the upper case and the lower case; a longitudinal square tube mounted on the battery module stack; a vertical square tube mounted on the battery module stack; and a horizontal square tube mounted on the battery module stack.

20 Claims, 23 Drawing Sheets

(51) Int. Cl.
*H01M 10/625* (2014.01)
*H01M 10/6556* (2014.01)
*H01M 10/6568* (2014.01)
*H01M 50/209* (2021.01)
*H01M 50/249* (2021.01)
*H01M 50/258* (2021.01)

(52) U.S. Cl.
CPC ....... *H01M 50/209* (2021.01); *H01M 50/258* (2021.01); *H01M 10/613* (2015.04); *H01M 10/625* (2015.04); *H01M 50/249* (2021.01)

(58) Field of Classification Search
CPC ......... H01M 10/6555; H01M 10/6557; H01M 10/6567; H01M 2220/20; H01M 50/264; H01M 50/204; H01M 50/20; H01M 10/6551
See application file for complete search history.

(56) References Cited

U.S. PATENT DOCUMENTS

| | | |
|---|---|---|
| 2011/0117419 A1 | 5/2011 | Lee et al. |
| 2012/0263991 A1 | 10/2012 | Temmyo et al. |
| 2013/0341111 A1 | 12/2013 | Lee et al. |
| 2015/0144409 A1 | 5/2015 | Fujii |
| 2015/0249238 A1 | 9/2015 | Andre et al. |
| 2018/0175466 A1 | 6/2018 | Seo et al. |
| 2019/0267686 A1 | 8/2019 | Shimizu et al. |

FOREIGN PATENT DOCUMENTS

| | | |
|---|---|---|
| CN | 207651549 U | 7/2018 |
| CN | 208111534 U | 11/2018 |
| CN | 208849024 U | 5/2019 |
| DE | 87 02 779.8 U1 | 8/1987 |
| EP | 2 555 277 A1 | 2/2013 |
| JP | 50-123297 U | 10/1975 |
| JP | 8-282811 A | 10/1996 |
| JP | 2005-50616 A | 2/2005 |
| JP | 2005-116427 A | 4/2005 |
| JP | 2008-110693 A | 5/2008 |
| JP | 2009-283148 A | 12/2009 |
| JP | 2011-108652 A | 6/2011 |
| JP | 2014-515867 A | 7/2014 |
| JP | 2015-510230 A | 4/2015 |
| JP | 2015-141878 A | 8/2015 |
| JP | 2016-100291 A | 5/2016 |
| JP | 2017-73270 A | 4/2017 |
| KR | 10-2008-0027504 A | 3/2008 |
| KR | 10-2011-0073221 A | 6/2011 |
| KR | 10-2012-0099063 A | 9/2012 |
| KR | 10-2013-0091172 A | 8/2013 |
| KR | 10-1799542 B1 | 11/2017 |
| WO | WO 2014/034079 A1 | 3/2014 |
| WO | WO 2018/025567 A1 | 2/2018 |

OTHER PUBLICATIONS

Extended European Search Report dated Jul. 28, 2022 for Application No. 20877206.1.
International Search Report (PCT/ISA/210) issued in PCT/KR2020/008430 mailed on Oct. 8, 2020.

* cited by examiner

[FIG. 1]
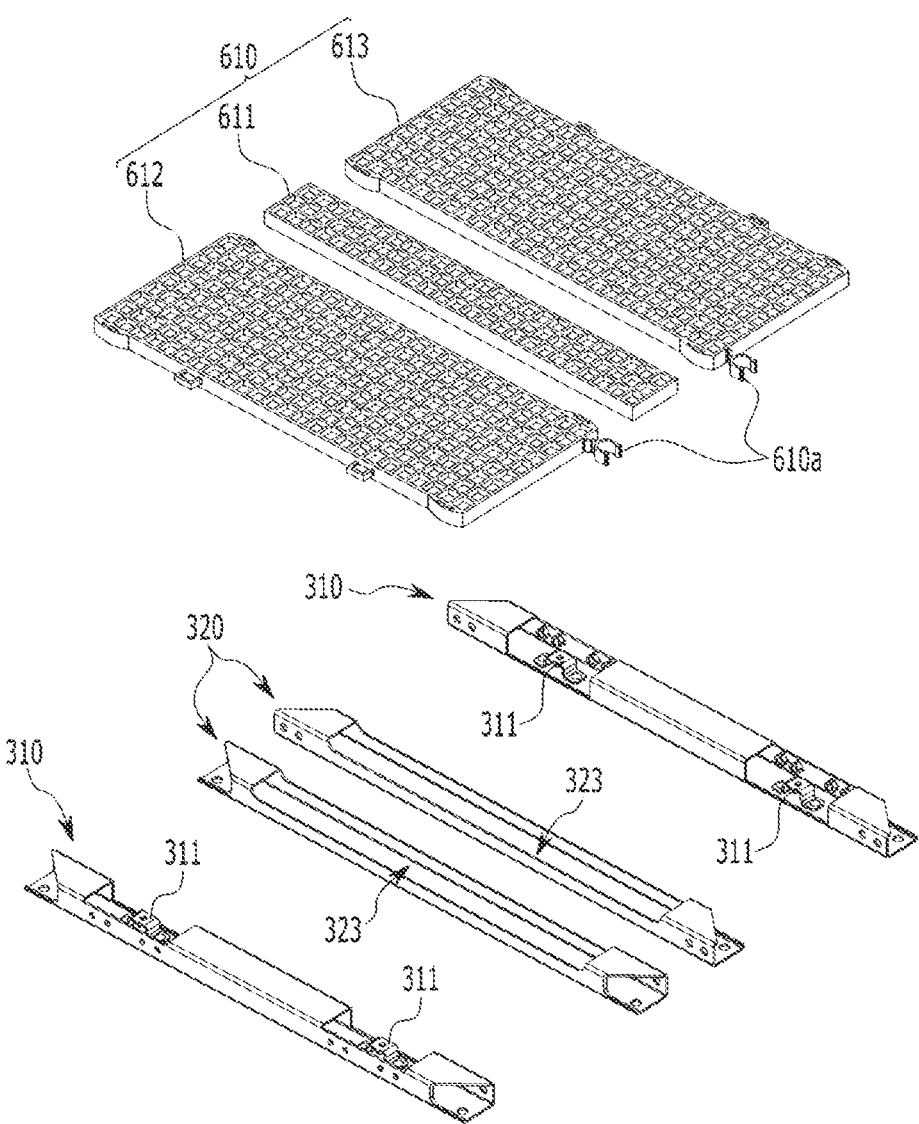

[FIG. 2]
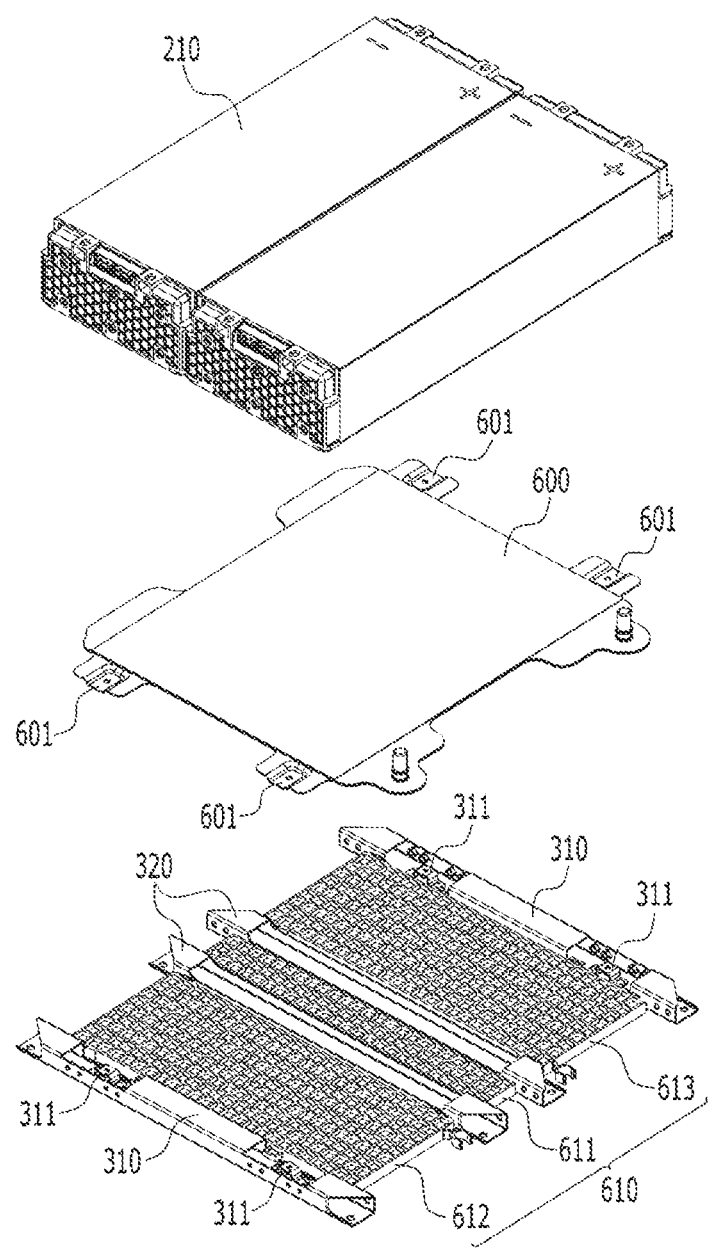

[FIG. 3]
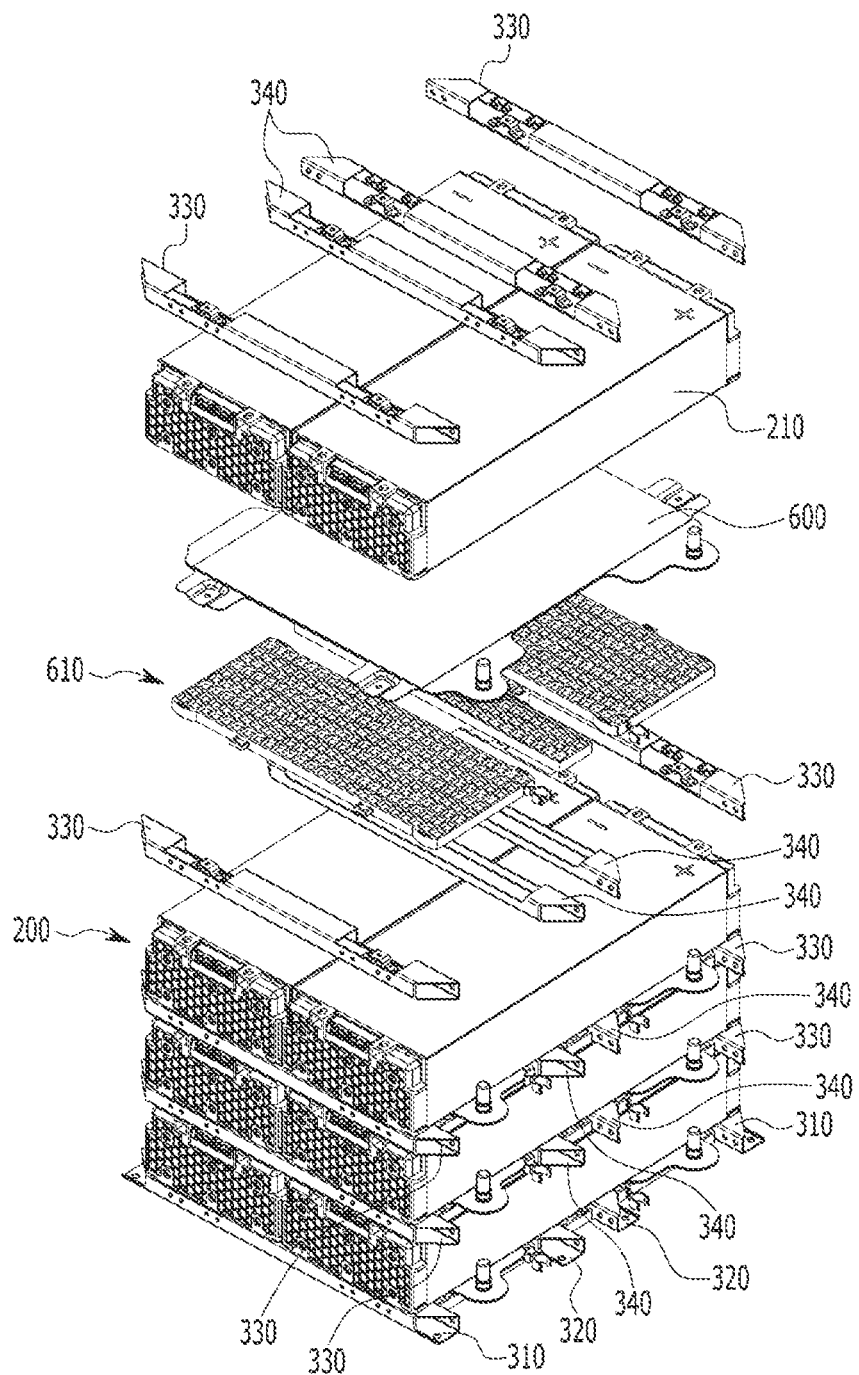

[FIG. 4]
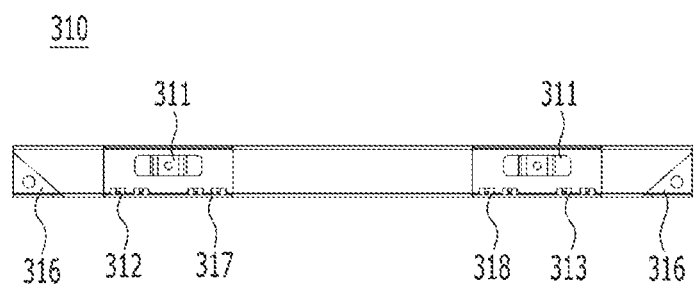
(a)
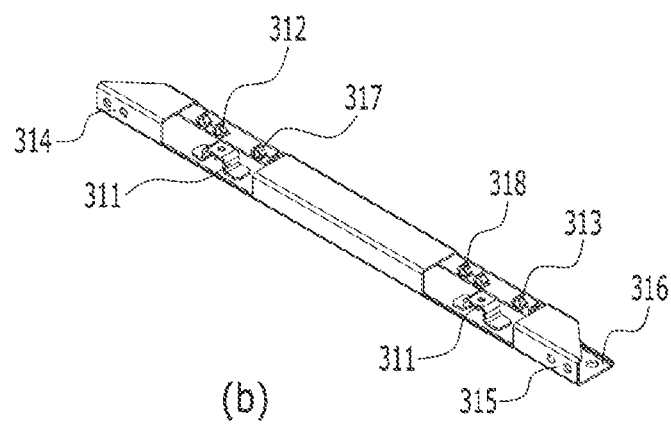
(b)
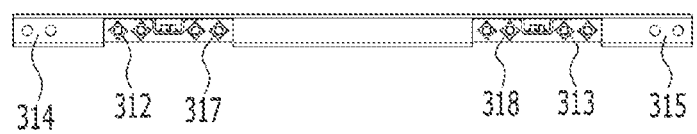
(c)

[FIG. 5]
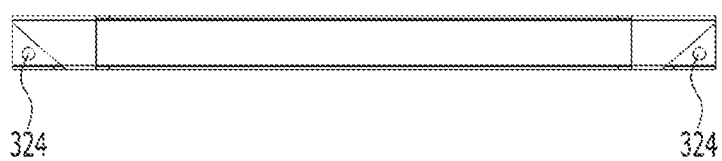
(a)
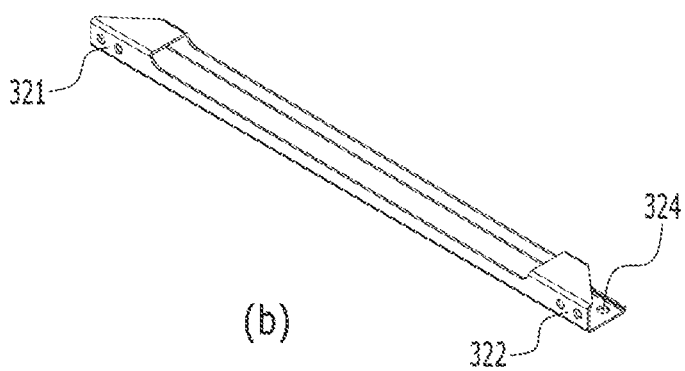
(b)
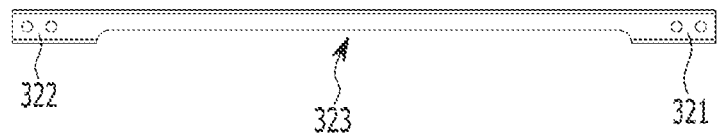
(c)

[FIG. 6]
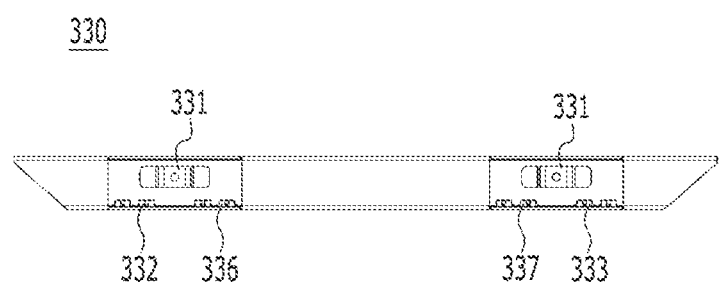
(a)
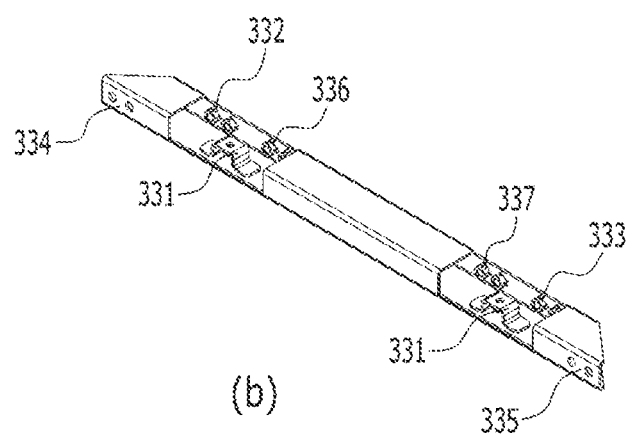
(b)
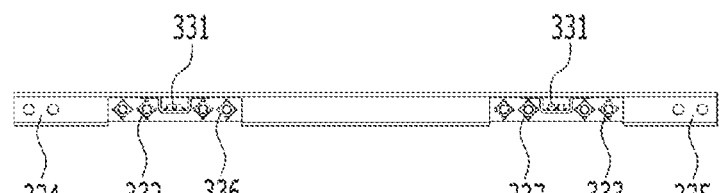
(c)

[FIG. 7]
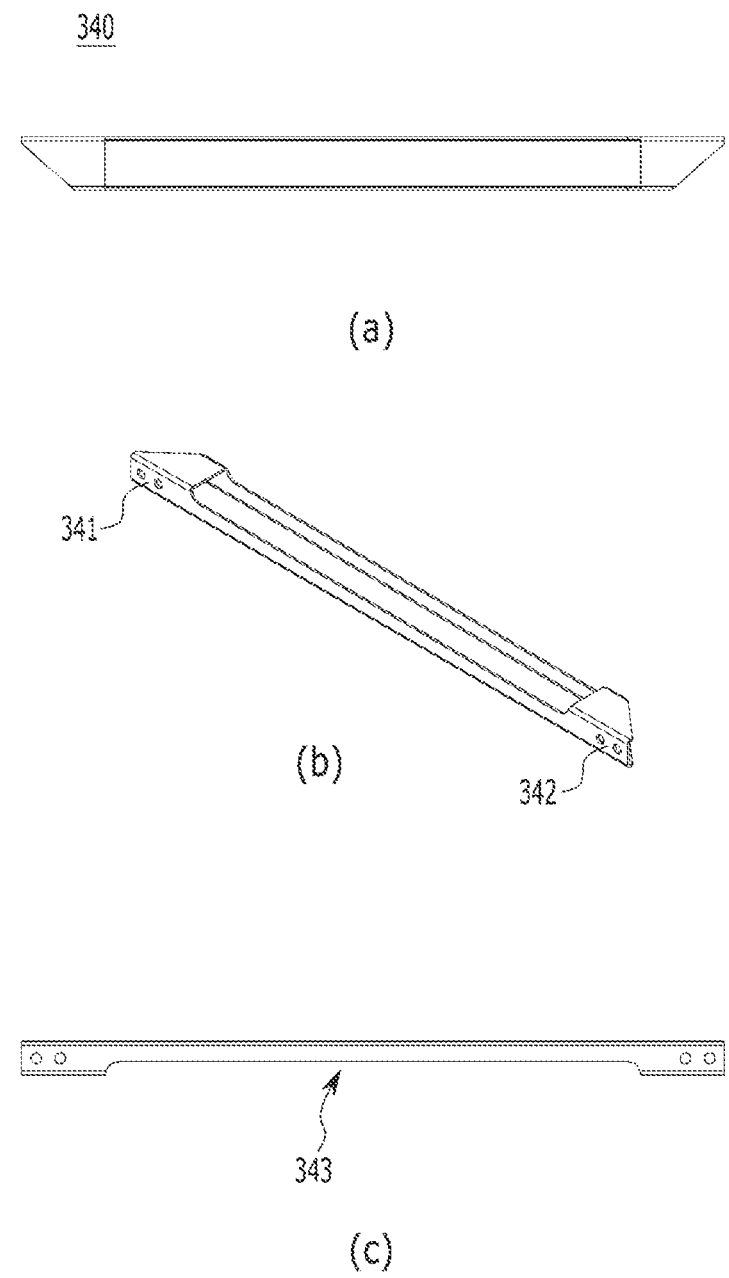

[FIG. 8]
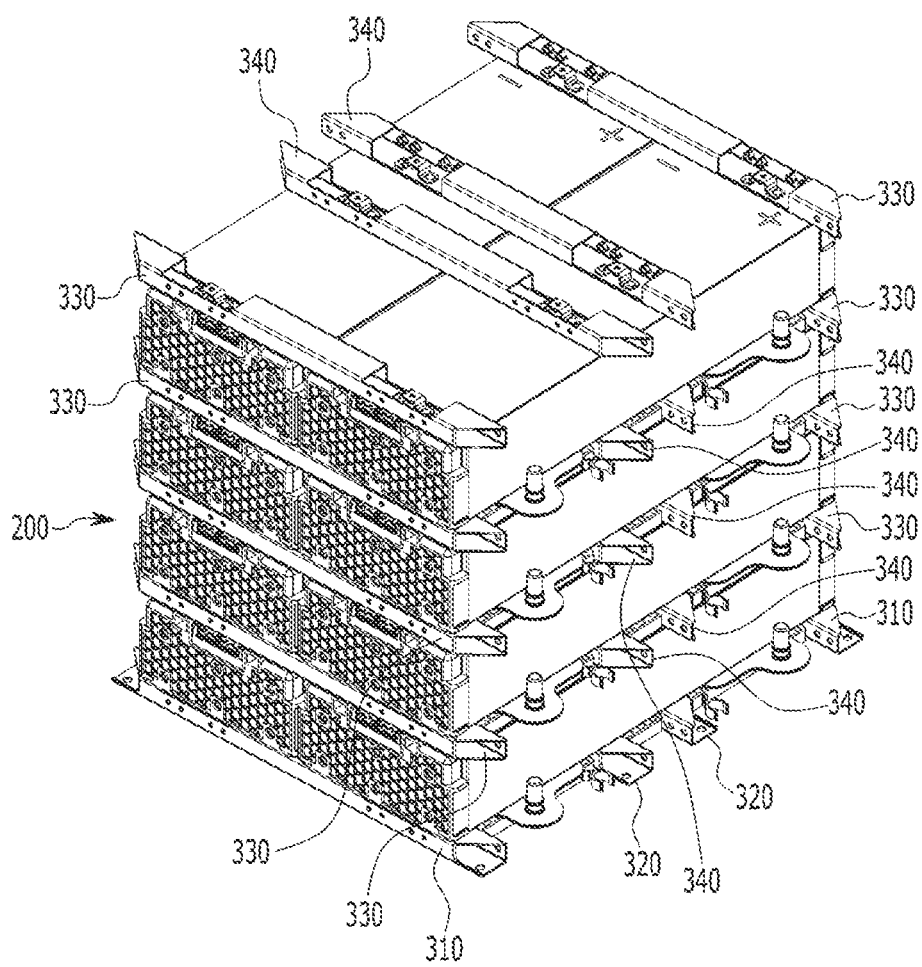

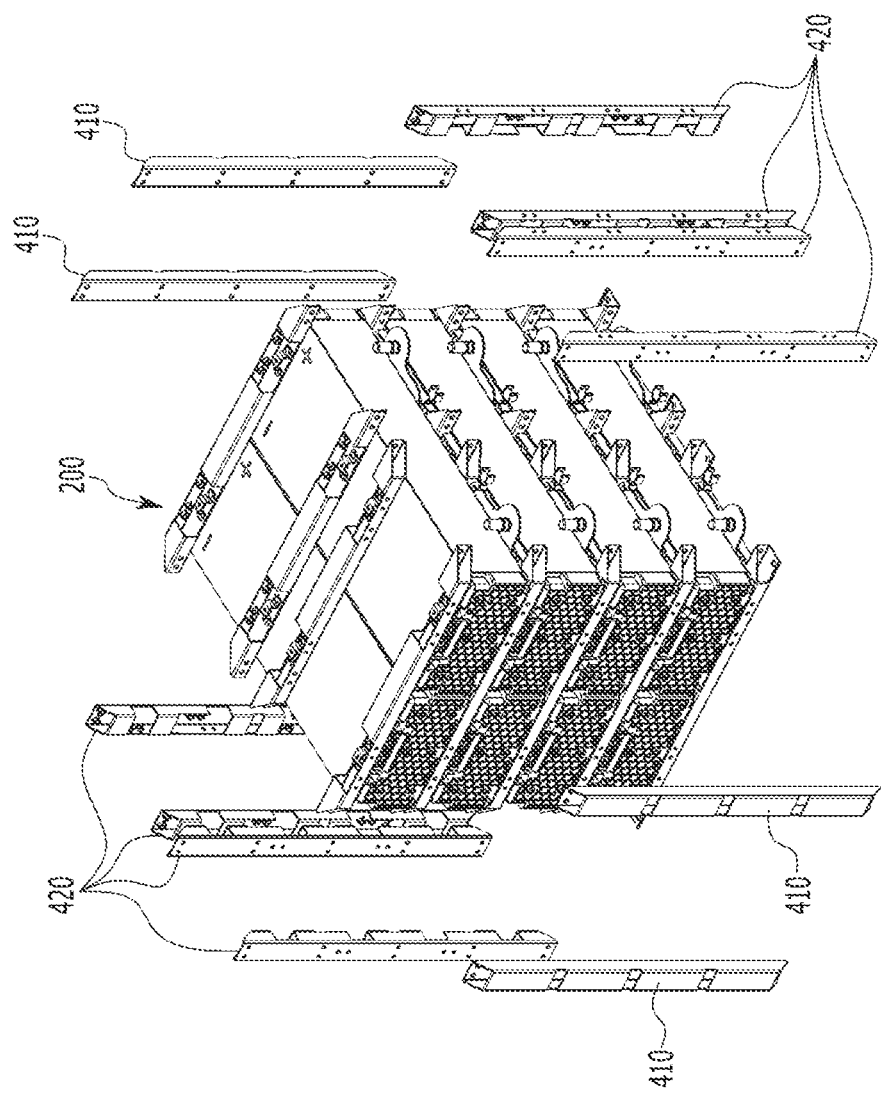
[FIG. 9]

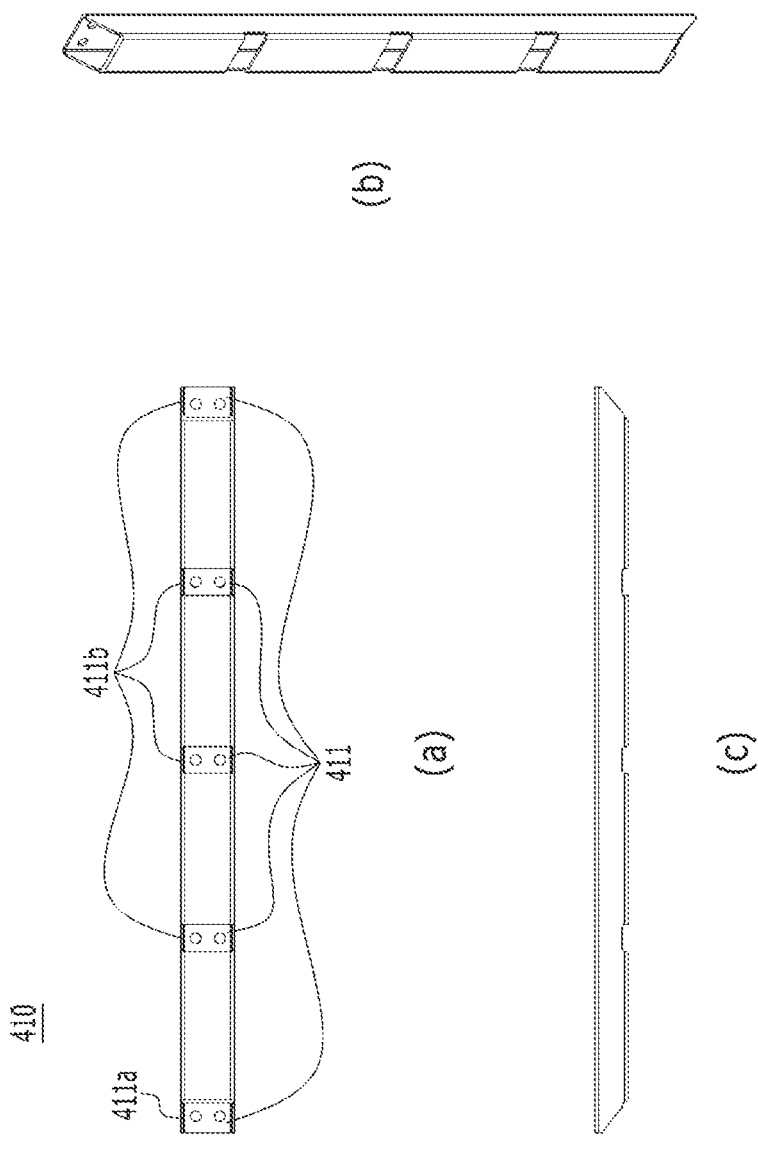
[FIG. 10]

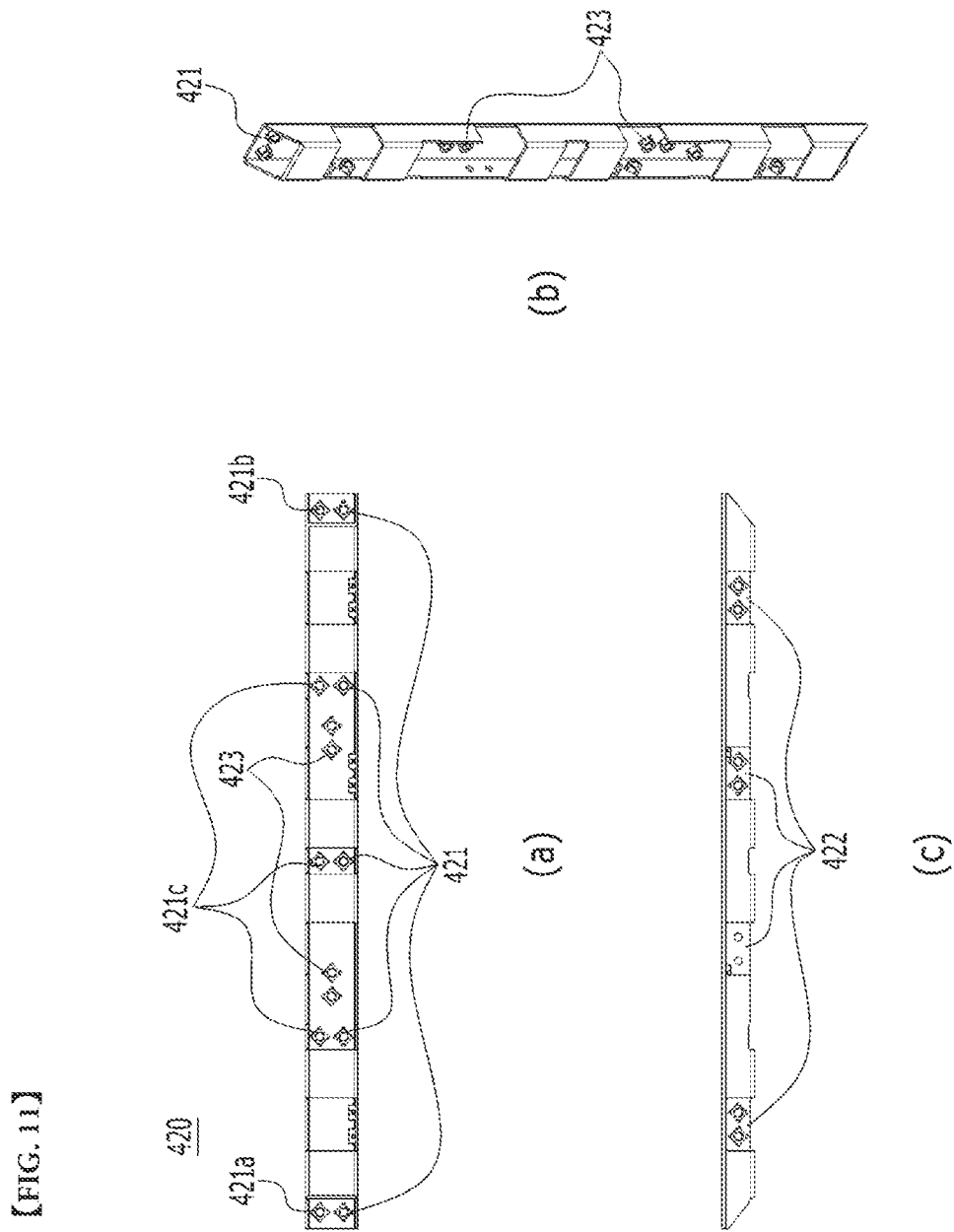
[FIG. 11]

[FIG. 12]
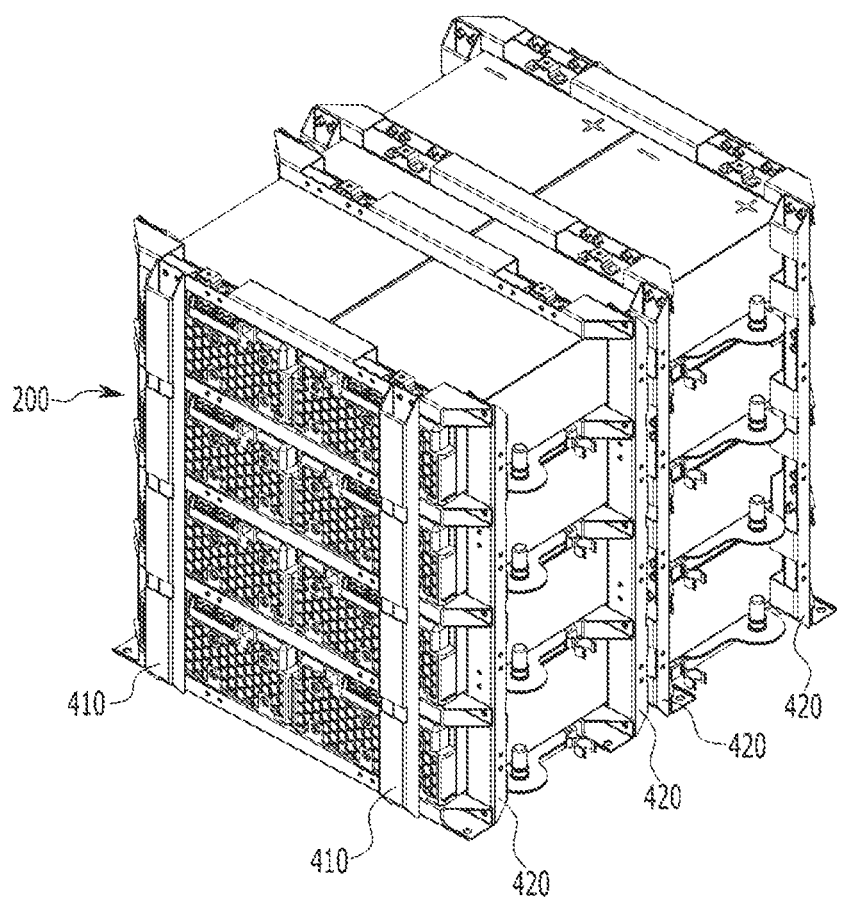

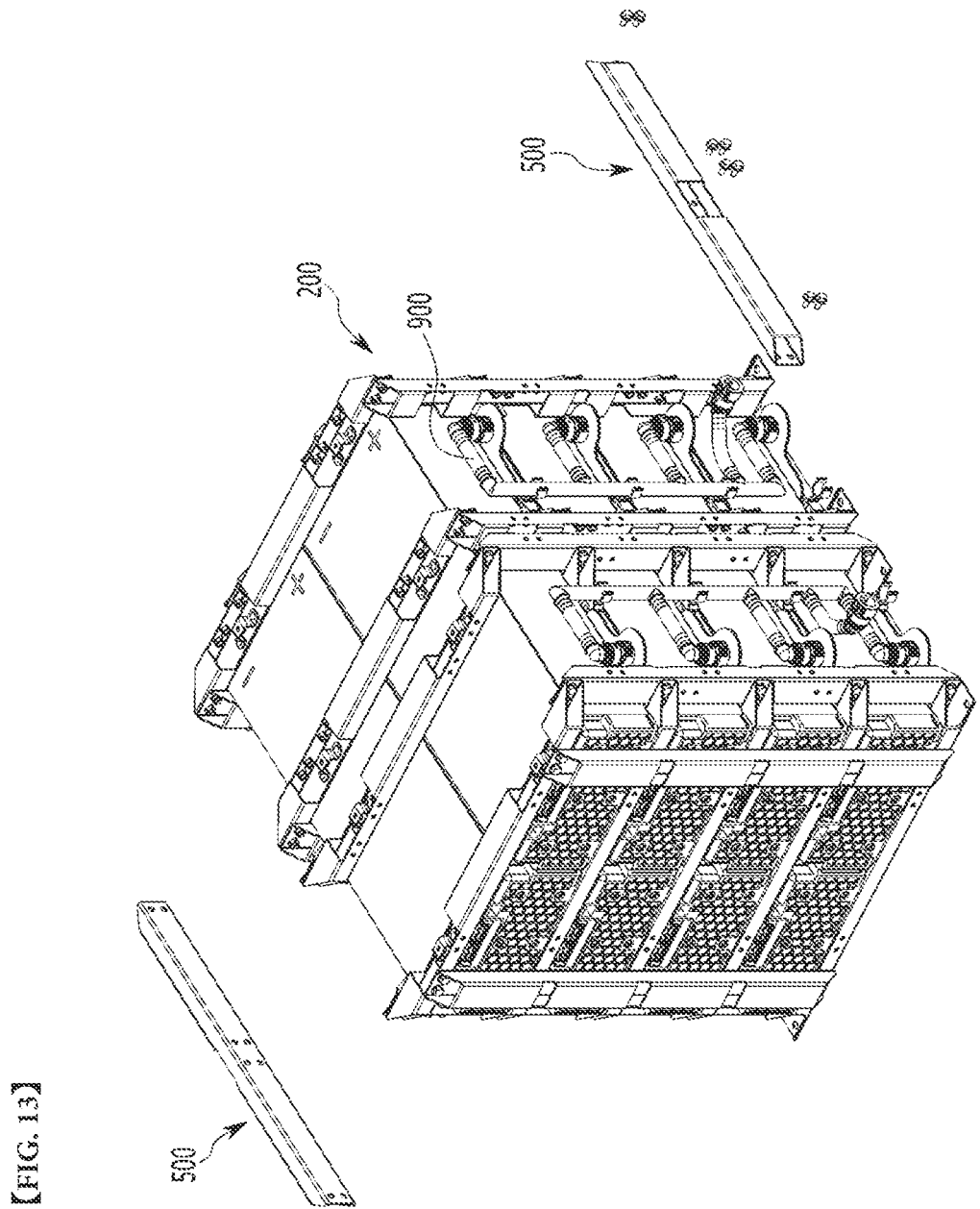

[FIG. 14]
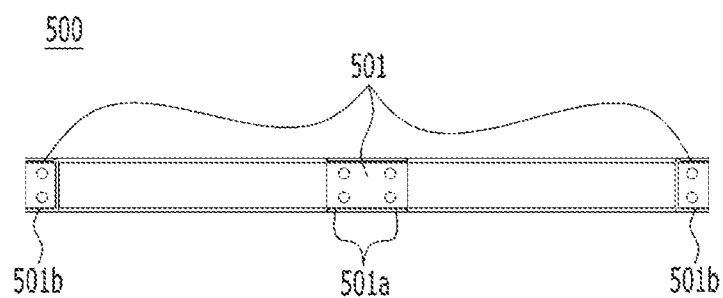
(a)
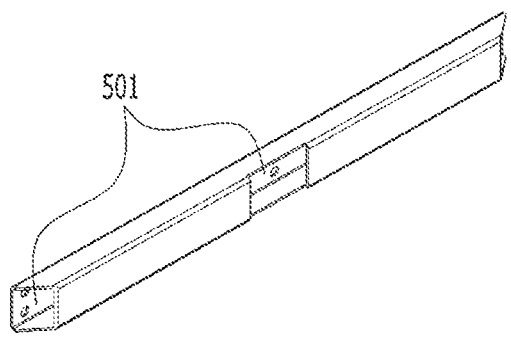
(b)
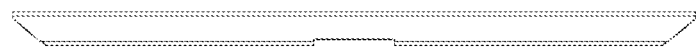
(c)

[FIG. 15]
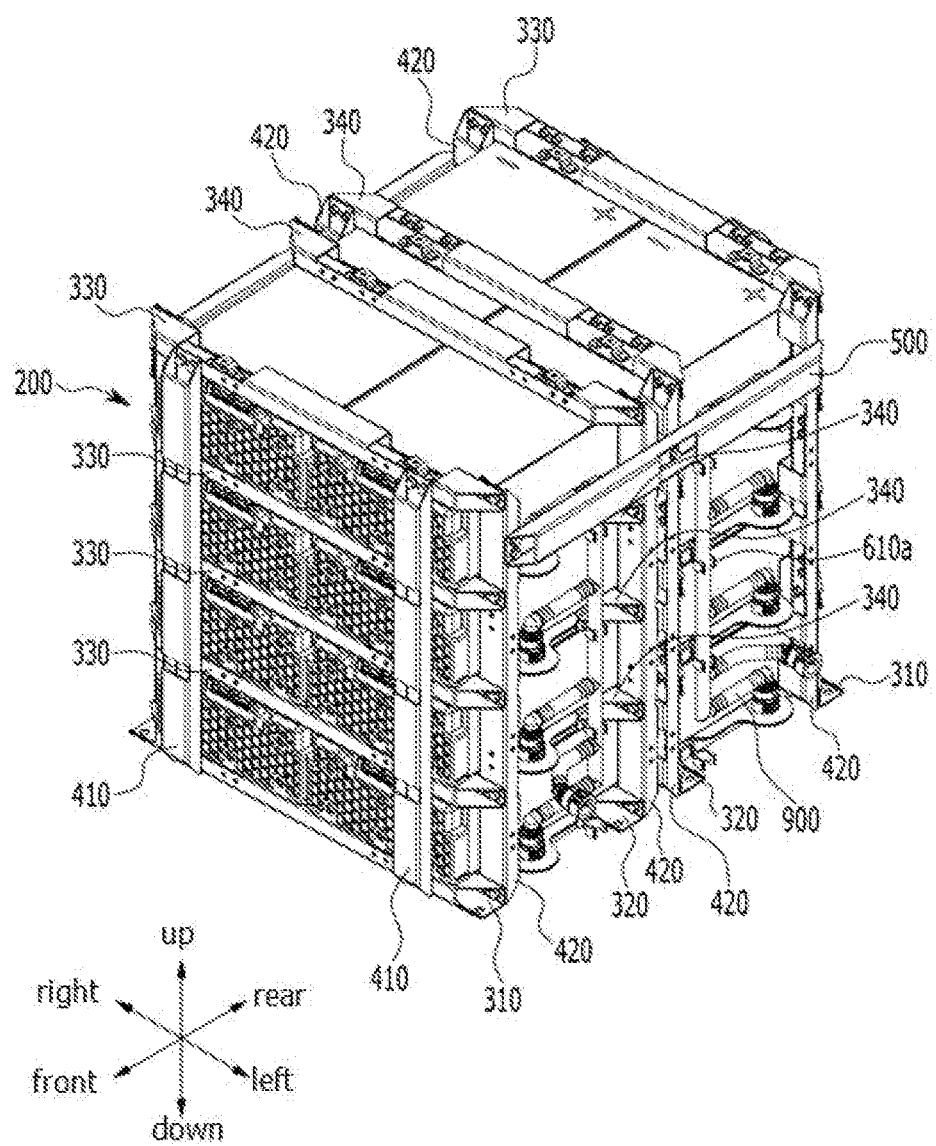

[FIG. 16]
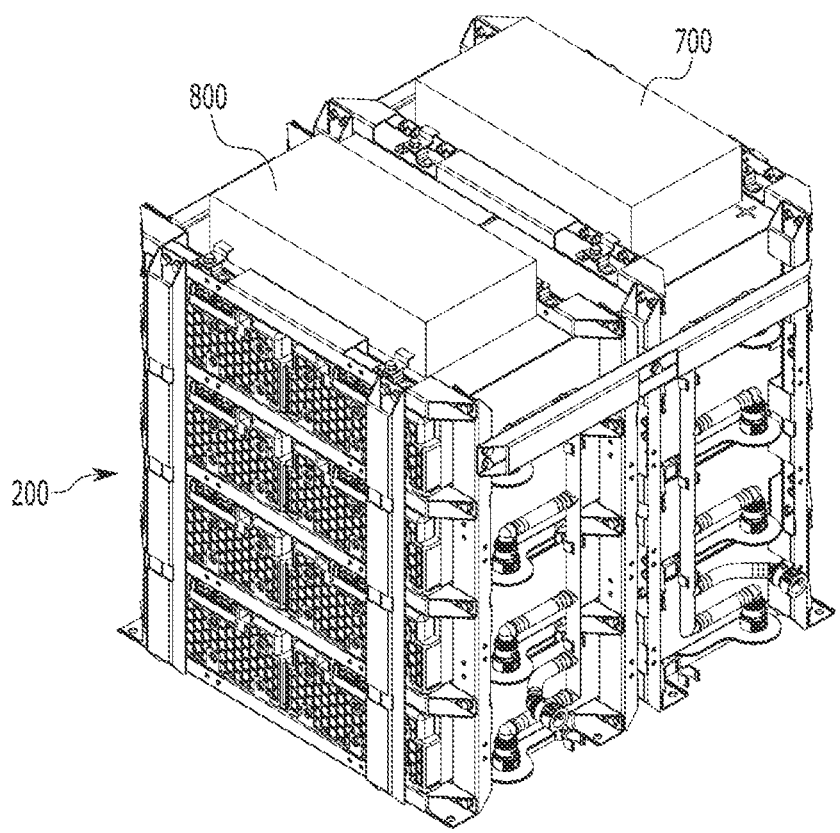

[FIG. 17]
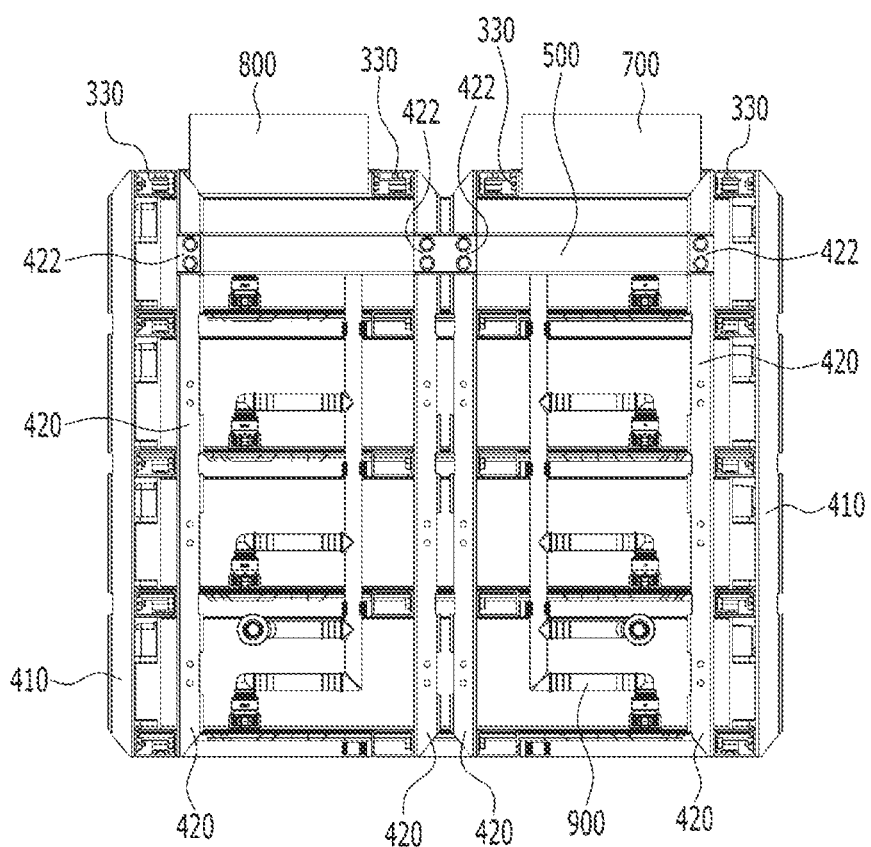

[FIG. 18]
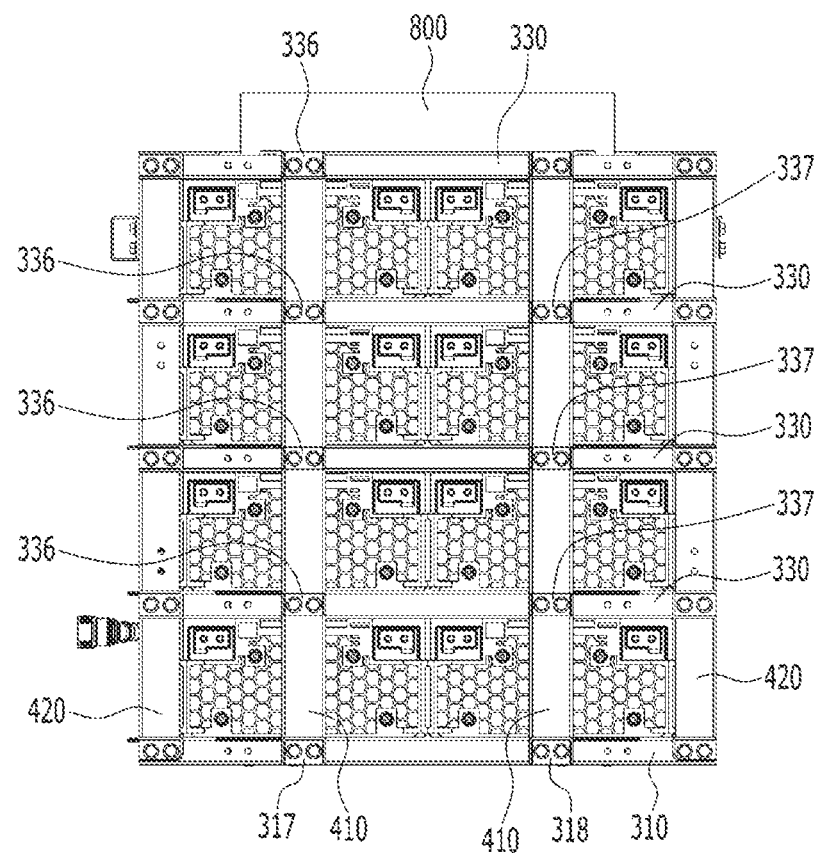

[FIG. 19]
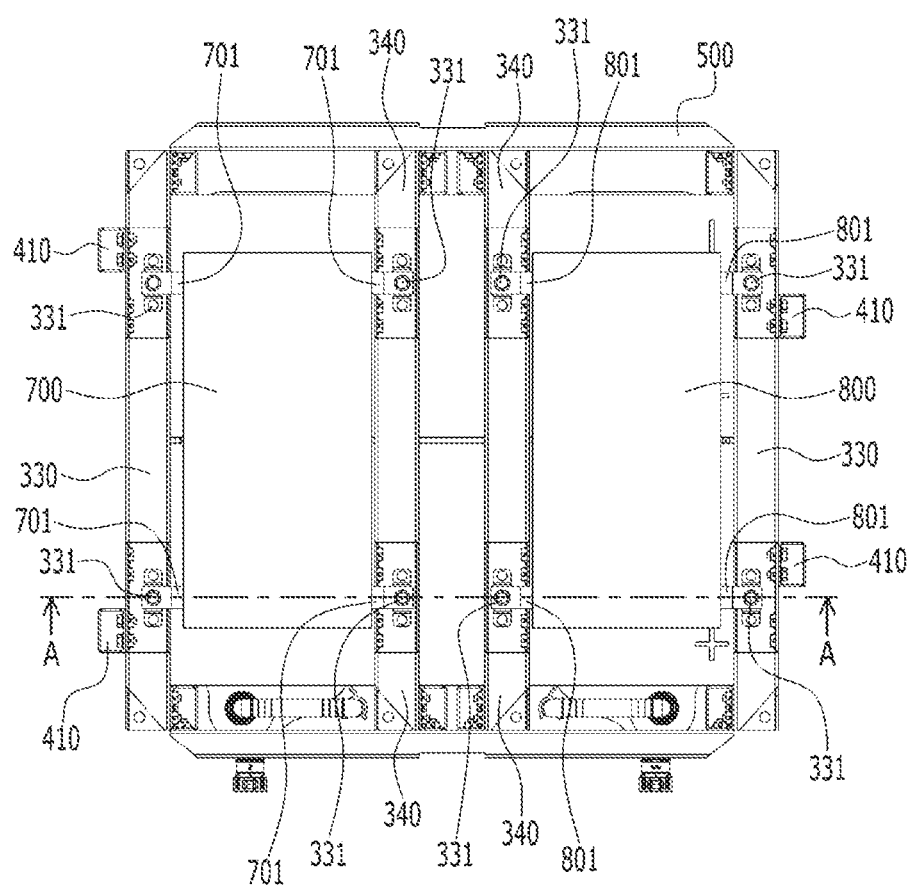

[FIG. 20]
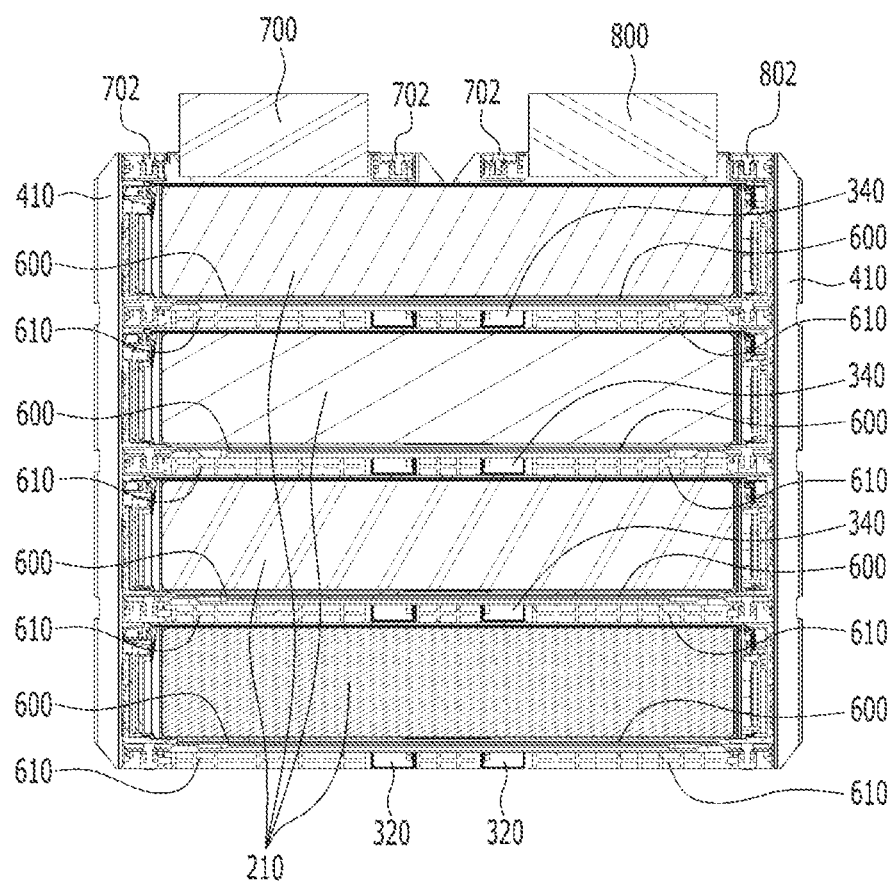

[FIG. 21]
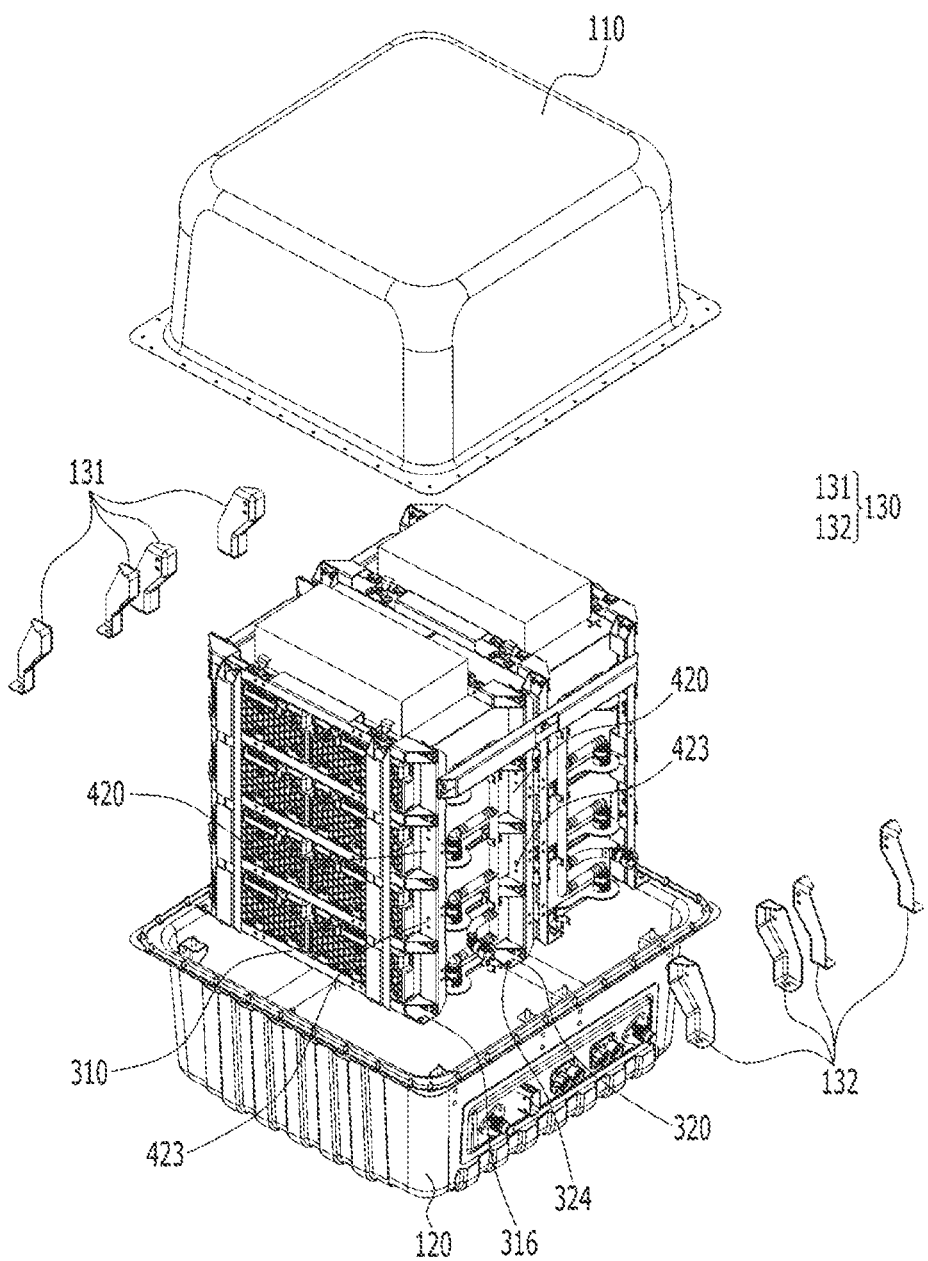

[FIG. 22]
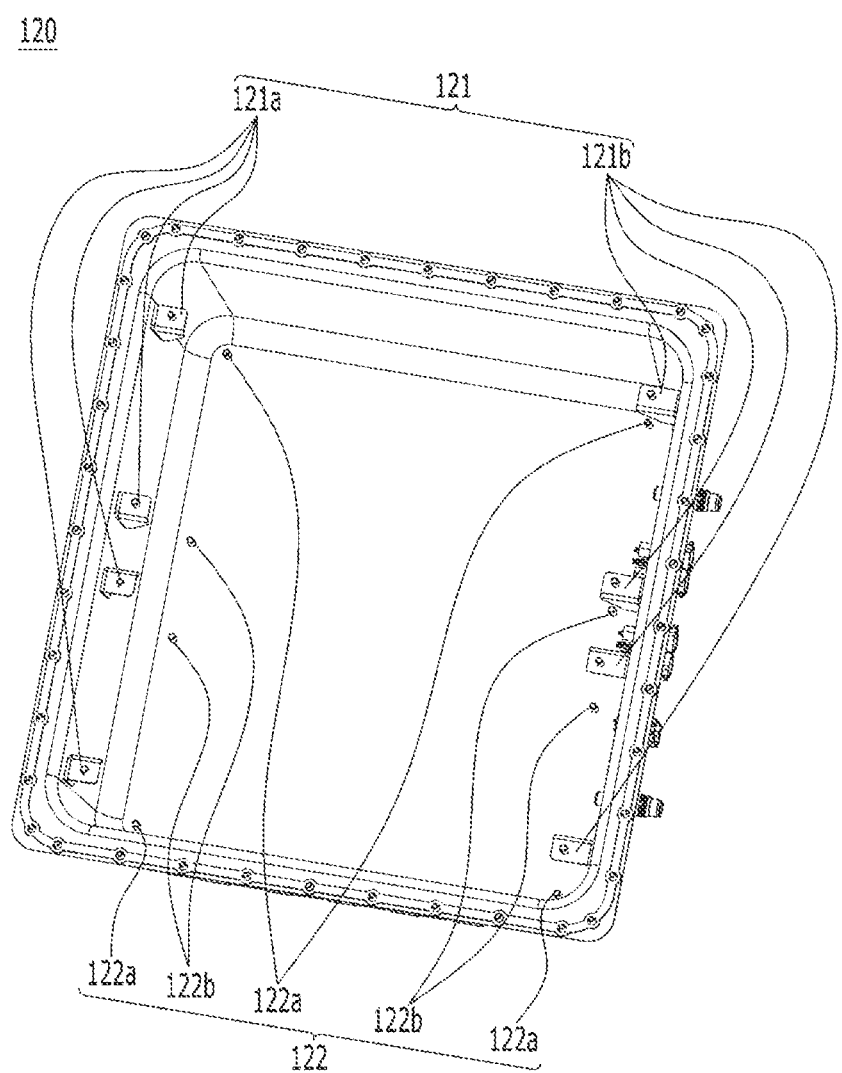

[FIG. 23]
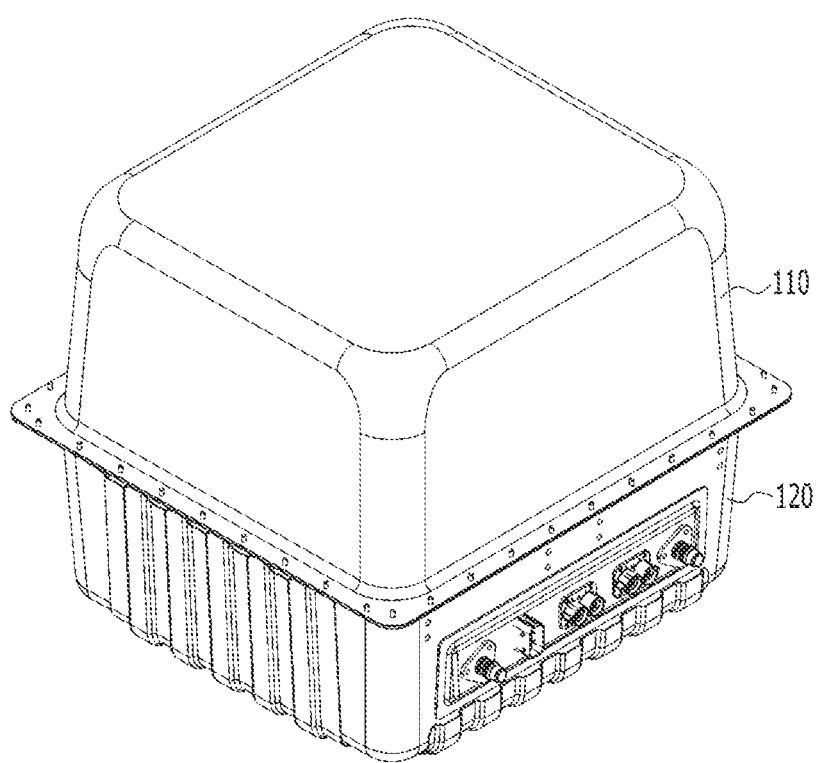

BATTERY PACK AND MANUFACTURING METHOD THEREOF

CROSS-CITATION WITH RELATED APPLICATION(S)

This application claims the benefit of Korean Patent Application No. 10-2019-0127009 filed on Oct. 14, 2019 with the Korean Intellectual Property Office, the disclosures of which is incorporated herein by reference in its entirety.

TECHNICAL FIELD

The present disclosure relates to a battery pack and a method for manufacturing the same, and more particularly, to a battery pack having a simplified structure and a method for manufacturing the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell, and to configure a battery pack by using at least one of the battery modules and adding other components.

Such a battery pack includes an upper case and lower case, a battery module stack in which battery modules are stacked between the upper case and the lower case, and a plurality of tubes for fixing the battery modules of the battery module stack.

In conventional indirect water-cooled battery modules, a cooling plate (heat sink) through which liquid refrigerant flows was attached to the lower part of the battery module, and it was usually mounted on the pack tray as only one layer. This is because the battery pack is generally placed low and wide on the floor under the seat space of a passenger car.

Recently, electric drive development has been carried out not only for passenger cars but also for commercial vehicles such as trucks. In the case of a truck like this, There is a demand to locate the driving battery in the location where the existing fuel tank was placed (specifically, the space under the cargo compartment on the left and right sides behind the front axle). The battery pack mounted on a commercial vehicle in this way has no choice but to have a rectangular shape with a high height unlike a passenger car. In order to arrange a plurality of battery modules, there is no choice but to arrange the battery modules in multiple layers. At the same time, the position of the battery pack is placed at the outermost part of the vehicle, so that high crush safety is required in consideration of a collision accident.

DETAILED DESCRIPTION OF THE INVENTION

Technical Problem

It is an object of the present disclosure to provide a battery pack excellent in compression stability and having a simplified battery module fixing structure, and a method for manufacturing the same.

The problem to be solved by the present disclosure is not limited to the above-mentioned problems, and other problems not mentioned should be clearly understood by those skilled in the art from the following description.

Technical Solution

In order to achieve the above objects, a battery pack according to one embodiment of the present disclosure comprises: an upper case and lower case; a battery module stack in which battery modules are stacked between the upper case and the lower case; a longitudinal square tube formed in the left and right directions of the stacked battery modules and mounted on the battery module stack; a vertical square tube formed in the vertical direction of the stacked battery modules and mounted on the battery module stack; and a horizontal square tube formed in the front and rear directions of the stacked battery modules and mounted on the battery module stack, wherein the longitudinal square tube is formed of a plurality of tubes, and the plurality of longitudinal square tubes are stacked and arranged in the vertical direction between the stacked battery modules so as to be coupled with all of the battery modules formed in the left and right directions at an uppermost part and a lowermost part, wherein the vertical square tubes is formed of a plurality of tubes, and the plurality of vertical square tubes are coupled to all the parts of the longitudinal square tubes respectively located on a plurality of axes of the stacked vertical square tubes among the stacked longitudinal square tubes in the four-direction outer periphery of the battery module stack, and wherein the horizontal square tubes is formed of a plurality of tubes, and the plurality of horizontal square tubes are coupled to all the parts of each of the vertical square tubes respectively located on a plurality of axes of the plurality of vertical square tubes, from the outside of the plurality of vertical square tubes.

In order to achieve the above objects, a method for manufacturing a battery pack according to one embodiment of the present disclosure includes: the steps of: stacking and arranging a plurality of longitudinal square tubes mounted on the battery module stack in a vertical direction between the stacked battery modules so as to be coupled integrally with the battery modules formed in the left and right directions at the uppermost part and the lowermost part; coupling a plurality of vertical square tubes with all of the longitudinal square tubes respectively located on a plurality of longitudinal axes of the stacked longitudinal square tubes in the four-direction outer periphery of the battery module stack; and in the outside of the plurality of vertical square tubes, coupling a plurality of horizontal square tubes with all of the parts of the vertical pipes respectively located on a plurality of axes in the front and rear directions among the plurality of vertical square tubes.

The plurality of longitudinal square tubes may include: a plurality of first longitudinal square tubes formed at both ends of the lowermost parts of the stacked battery modules; at least one second longitudinal square tube formed between the plurality of first longitudinal square tubes at the lowermost parts of the stacked battery modules; a plurality of third longitudinal square tubes formed at both ends of a plurality of longitudinal square tubes formed between the uppermost part of the stacked battery modules and the stacked battery modules; and at least one fourth longitudinal square tube formed between the plurality of third longitudinal square tubes excluding the plurality of third longitudinal square tubes formed on the uppermost part of the stacked battery modules.

The battery pack may include a heat sink formed between the battery modules and the plurality of longitudinal square tubes, and a heat sink insulator that is arranged between the heat sink and a battery module located below the heat sink so that the heat sink is into close contact with the battery module.

The plurality of first longitudinal square tubes and the plurality of third longitudinal square tubes may be coupled to the heat sink.

Connecting parts are formed on both sides of the plurality of first longitudinal square tubes and the plurality of third longitudinal square tubes, and the plurality of first longitudinal square tubes or the plurality of third longitudinal square tubes may be coupled to the heat sink via the connecting part.

The at least one second longitudinal square tube and the at least one fourth longitudinal square tube may have a cut-out part formed therein, and the heat sink is inserted into the cut-out part.

The heat sink insulator includes a first heat sink insulator formed in the center; and second and third heat sink insulators formed on both sides, the second longitudinal square tubes are formed of two or more tubes, the first heat sink insulator is formed between the plurality of second longitudinal square tubes and between the plurality of fourth longitudinal square tubes, and the second and third heat sink insulators are formed between the first longitudinal square tubes at both ends and the second longitudinal square tubes closest to each other, and between the third vertical square tube at both ends and the fourth longitudinal square tubes closest to each other.

The battery pack further includes a cooling water pipe for supplying cooling water to the heat sink, wherein the cooling water pipe is formed on one surface of the battery module stack.

A tongs part is formed on one side of the heat sink insulator, and the cooling water pipe may be fixed through the tongs part.

A support portion supporting the battery module stack and coupled to the lower case may be formed in the plurality of first longitudinal square tubes and the at least one second longitudinal square tube.

The plurality of vertical square tubes may include a plurality of first vertical square tubes which are coupled to one of the plurality of first longitudinal square tube, and the plurality of third longitudinal square tubes located on the same vertical axis as one of the plurality of first longitudinal square tubes; and a plurality of second vertical square tubes which are coupled to one of the plurality of second longitudinal square tubes, and one of the plurality of fourth longitudinal square tubes and the third longitudinal square tubes located on the same vertical axis as one of the plurality of second longitudinal square tubes.

A plurality of longitudinal square tube connecting parts are formed on one side of the first vertical square tube, and the plurality of longitudinal square tube connecting parts may be coupled to a first longitudinal square tube connecting part formed on one of the plurality of first longitudinal square tubes, and a first longitudinal square tube connecting part formed on the plurality of third longitudinal square tubes located on the same vertical axis as one of the plurality of first longitudinal square tubes.

A plurality of longitudinal square tube connecting parts are formed on one side of the second vertical square tube, and the plurality of v longitudinal square tube connecting parts may be coupled to a second longitudinal square tube connecting part formed on one of the plurality of second longitudinal square tubes, a second longitudinal square tube connecting part formed on the plurality of fourth longitudinal square tubes located on the same vertical axis as one of the plurality of fourth longitudinal square tubes, and a second longitudinal square tube connecting parts formed on one of the plurality of third longitudinal square tubes.

The plurality of vertical square tubes include a plurality of second longitudinal square tubes that are coupled to one of the plurality of first longitudinal square tubes, and a plurality of third longitudinal square tubes located on the same vertical axis as one of the plurality of first longitudinal square tubes, a plurality of longitudinal square tube connecting parts are formed on one side of the second longitudinal square tube, the plurality of longitudinal square tube connecting parts are coupled to a second longitudinal square tube connecting part formed on one of the plurality of first longitudinal square tubes, and a second longitudinal square tube connecting parts formed on the plurality of third longitudinal square tubes located on the same vertical axis as one of the plurality of first longitudinal square tubes.

The plurality of horizontal square tubes may be coupled to the plurality of second longitudinal square tubes located coaxially in the front and rear directions.

A plurality of vertical square tube connecting parts may be formed in the plurality of horizontal square tubes, and the plurality of vertical square tube connecting parts may be coupled to the horizontal square tube connecting part is formed in the plurality of second vertical square tubes.

The battery pack may further include a plurality of brackets fixing the battery module stack to the lower case.

The method may further include the steps of: fixing the battery module stack to the lower case via a bracket and coupling the upper case to the lower case, after the step of combining the plurality of horizontal square tubes.

Advantageous Effects

The battery pack and its manufacturing method according to an embodiment of the present disclosure improve the compression stability of the battery modules and at the same time, provide weight reduction and price competitiveness, by fixing the stacked battery modules using most simplified square tubes.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view illustrating first and second longitudinal square tubes and a heat sink insulator according to an embodiment of the present disclosure.

FIG. 2 is a perspective view illustrating the assembled configuration of FIG. 1 and a heat sink and battery modules according to an embodiment of the present disclosure.

FIG. 3 is a perspective view illustrating a state in which a plurality of battery modules are stacked together with a plurality of longitudinal square tubes according to an embodiment of the present disclosure.

FIG. 4 is a top view (a), a perspective view (b), and a side view (c) of a first longitudinal square tube according to an embodiment of the present disclosure.

FIG. 5 is a top view (a), a perspective view (b), and a side view (c) of a second longitudinal square tube according to an embodiment of the present disclosure.

FIG. 6 is a top view (a), a perspective view (b), and a side view (c) of a third longitudinal square tube according to an embodiment of the present disclosure.

FIG. 7 is a top view (a), a perspective view (b), and a side view (c) of a fourth longitudinal square tube according to an embodiment of the present disclosure.

FIG. 8 is a view illustrating a state in which each longitudinal square tube is coupled to the battery module stack according to an embodiment of the present disclosure.

FIG. 9 is a view illustrating the configuration of FIG. 8 and a plurality of vertical square tubes according to an embodiment of the present disclosure.

FIG. 10 is a top view (a), a perspective view (b), and a side view (c) of a first vertical angle tube according to an embodiment of the present disclosure.

FIG. 11 is a top view (a), a perspective view (b), and a side view (c) of a second vertical angle tube according to an embodiment of the present disclosure.

FIG. 12 is a view illustrating a state in which a plurality of vertical square tubes are coupled to the battery module stack of FIG. 9.

FIG. 13 is a view illustrating the configuration of FIG. 12 and horizontal square tubes according to an embodiment of the present disclosure.

FIG. 14 is a top view (a), a perspective view (b), and a side view (c) of horizontal square tubes according to an embodiment of the present disclosure.

FIG. 15 is a view illustrating a state in which a plurality of horizontal square tubes are coupled to the battery module stack of FIG. 12.

FIG. 16 is a view illustrating a state in which BMS and BDU are coupled to a battery module stack according to an embodiment of the present disclosure.

FIG. 17 is a front view of FIG. 16.

FIG. 18 is a rear view of FIG. 16.

FIG. 19 is a top view of FIG. 16.

FIG. 20 is a cross-sectional view illustrating a portion A-A' of FIG. 19.

FIG. 21 is a view illustrating a battery module stack, upper and lower cases, and brackets according to an embodiment of the present disclosure.

FIG. 22 is a view illustrating a lower case according to an embodiment of the present disclosure.

FIG. 23 is a view illustrating a state in which the upper and lower cases are assembled according to an embodiment of the present disclosure.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, operation, constitutional elements, or combinations thereof, but it should be understood that they do not preclude a possibility of existence or addition of one or more other features, numbers, steps, operation, constitutional elements, or combinations thereof.

The order of the figures corresponding to the content of the invention described later shows the process for assembling the battery pack according to an embodiment of the present disclosure in order. Further, the arrangement directions of the components forming the present disclosure described later will be described in the directions corresponding to the front and rear directions, the left and right directions, and the up and down directions shown in FIG. 15 which is a representative figure. The reference of the directions is in accordance with the arrangement direction of the battery modules of the present disclosure.

Hereinafter, referring mainly to FIGS. 1 to 8, the longitudinal square tube and the peripheral configuration connected to the longitudinal square tube according to an embodiment of the present disclosure will be described. FIG. 1 is a perspective view illustrating first and second longitudinal square tubes and a heat sink insulator according to an embodiment of the present disclosure. FIG. 2 is a perspective view illustrating the assembled configuration of FIG. 1 and a heat sink and battery modules according to an embodiment of the present disclosure. FIG. 3 is a perspective view illustrating a state in which a plurality of battery modules are stacked together with a plurality of longitudinal square tubes according to an embodiment of the present disclosure. FIG. 4 is a top view (a), a perspective view (b), and a side view (c) of a first longitudinal square tube according to an embodiment of the present disclosure. FIG. 5 is a top view (a), a perspective view (b), and a side view (c) of a second longitudinal square tube according to an embodiment of the present disclosure. FIG. 6 is a top view (a), a perspective view (b), and a side view (c) of a third longitudinal square tube according to an embodiment of the present disclosure. FIG. 7 is a top view (a), a perspective view (b), and a side view (c) of a fourth longitudinal square tube according to an embodiment of the present disclosure. FIG. 8 is a view illustrating a state in which each longitudinal square tube is coupled to the battery module stack according to an embodiment of the present disclosure.

First, referring to FIG. 8, the overall arrangement of a plurality of longitudinal square tubes will be described.

A plurality of longitudinal square tubes 300 are formed in the front and rear directions of the stacked battery modules 210 and are mounted on the battery module stack 200, and stacked and arranged vertically between the stacked battery modules 210 so as to be coupled with both the battery modules 210 formed in the left and right directions of the uppermost part and the lowermost part.

A plurality of longitudinal square tubes 300 for fixing the plurality of battery modules 210 of the battery module stack 200 may include a plurality of first longitudinal square tubes 310 formed at both (or opposite) ends of the lowermost parts of the stacked battery modules 210, at least one second longitudinal square tube 320 formed between the plurality of first longitudinal square tubes 310 at the lowermost part of the stacked battery modules 210, a plurality of third longitudinal square tubes 330 formed at the uppermost part of the stacked battery modules 210 and both ends of the plurality of longitudinal square tubes 300 formed between the stacked battery modules, and at least one fourth longitudinal square tube 340 formed between the plurality of third longitudinal square tubes 330 excluding the plurality of third longitudinal tubes 330 formed at the uppermost part of the stacked battery modules.

According to an embodiment of the present disclosure, the second longitudinal square tubes 320 can be arranged as two second longitudinal square tubes 320 maintaining the same distance as the first longitudinal square tubes 310 at both ends, between the first longitudinal square tubes 310 located at the lower part of both ends of the battery module stack 200.

Also, according to an embodiment of the present disclosure, the fourth longitudinal square tubes 340 may be arranged as two fourth longitudinal square tubes 340 maintaining the same distance as the third longitudinal square tubes 330 at both ends, between the two third longitudinal square tubes 330 located on the same plane among the plurality of third longitudinal square tubes 330 formed at both ends of the battery module stack 200. Further, the fourth longitudinal square tubes 340 may be stacked and arranged two by two in the vertical direction between the third longitudinal square tubes 330 so as to correspond to the vertically stacked positions of the plurality of third longitudinal square tubes 330 located at both ends of the lower part of each of the stacked battery modules 210.

According to an embodiment of the present disclosure, the battery modules 210 are stacked and arranged in four stages in the vertical direction. The third longitudinal square tubes 330 at both ends of each of the four-stage battery module 210 layers, and two fourth longitudinal square tubes 340 arranged so as to maintain a constant distance with the third longitudinal square tubes 330 between the third longitudinal square tubes 330, may be stacked and arranged in four stages.

Hereinafter, referring mainly to FIGS. 1 and 2, the arrangement of the heat sink 600 and the heat sink insulator 610 according to an embodiment of the present disclosure will be described.

Referring to FIGS. 1 and 2, the battery module 210 according to an embodiment of the present disclosure may have a structure in which a plurality of battery modules 210 are coupled in a horizontal direction. According to an embodiment of the present disclosure, the two battery modules 210 may be coupled in a direction perpendicular to the lengthwise direction of the battery module 210. As described above, the two battery modules 210 may be stacked and disposed in the vertical direction to form the battery module stack 200.

Referring to FIG. 2, a heat sink 600 may be arranged at the lower part of the battery modules 210 according to an embodiment of the present disclosure. In addition, a first longitudinal square tube 310 for fixing the heat sink insulator 610 and the heat sink insulator 610 may be disposed at the lower part of the heat sink 600.

The heat sink 600 may be formed between the battery modules 210 and the plurality of longitudinal square tubes 300. The battery module according to the present disclosure is an indirect water cooling module, and may cool heat generated from the battery module via a heat sink 600 located under the battery module. Therefore, the heat sink 600 may be disposed in close contact with the lower part of the battery modules 210.

Connecting parts 601 may be formed at both ends of the heat sink 600. As shown in FIG. 2, the connecting part 601 may be coupled with the connecting part 311 formed in the first longitudinal square tube 310. According to an embodiment of the present disclosure, the connecting parts 601 may be formed two by two at both ends of the heat sink 600, and the connecting part 311 formed in the first longitudinal square tubes 310 is also formed in two on both sides. The connecting part 601 of the heat sink 600 and the connection part 311 of the first longitudinal square tube 310 may be coupled to each other. At this time, in order to suppress the flow in the plane of the heat sink 600, the connecting part 311 of the first longitudinal square tube 310 and the connecting part 601 of the heat sink 600 may be fastened and fixed with bolts and nuts.

According to an embodiment of the present disclosure, two battery modules 210 are stacked and arranged in the vertical direction, and the heat sink 600 may be arranged at the lower part of the two battery modules 210 formed on each layer. Therefore, the heat sinks 600 are disposed at the lower part of the battery modules 210 stacked in the vertical direction so as to be in close contact with each other, thereby cooling heat generated from all the battery modules 210.

The configuration of the heat sink 600 formed at the lower part of the battery modules 210 shown in FIG. 2 and the first longitudinal square tube 310 may be equally applied to the structure of the battery module 210 that is stacked and arranged upward as shown in FIG. 3. However, in the structure stacked upwards, a third longitudinal square tube 330 may be formed at a position of the first longitudinal square tube 310 as shown in FIG. 3.

Therefore, in addition to the heat sink 600 formed under the battery modules 210 formed at the lowermost part, the connection parts 601 as shown in FIG. 2 are formed even at both ends of the heat sinks 600 formed at the lower part of each of the battery modules 210 stacked upward, wherein the connecting part 601 may be coupled to the connecting part 331 formed in the third longitudinal square tube 330 shown in FIG. 6. According to an embodiment of the present disclosure, the connecting part 601 of the heat sinks 600 formed above the bottom battery modules 210 is also formed in the same structure as the heat sink 600 formed below the bottom battery module 210. The connecting parts 331 formed on the third longitudinal square tubes 330 are also formed in two on both sides, so that the connecting parts 601 of the heat sink 600 and the connecting parts 331 of the third longitudinal square tubes 330 can be coupled with each other for each layer. Similarly, in order to suppress the flow in the plane of the heat sink 600, the connecting parts 331 of the third longitudinal square tube 330 and the connecting part 601 of the heat sink 600 may be fastened and fixed with bolts and nuts.

The second longitudinal square tube 320 may be arranged below the central part of the heat sink 600. Referring to FIG. 5, a cut-out part 323 is formed in the central part of the second longitudinal square tube 320, and the central part of the heat sink 600 may be inserted into the cut-out part 323 and fixed by the second longitudinal square tube 320.

The configurations of the heat sink 600 and the second longitudinal square tube 320 shown in FIG. 2 may be similarly applied to the structure of the battery module 210 that is stacked on the upper side as shown in FIG. 3. However, in the structure stacked on the upper side, a fourth longitudinal square tube 340 may be formed at a position of the second longitudinal square tube 320 as shown in FIG. 3.

The heat sink insulator 610 may be arranged between the heat sink 600 and the battery modules 210 located below the heat sink 600, so that the heat sink 600 may be in close contact with the battery module 610. The heat sink insulator 610 may be formed of plastic having excellent electrical insulation and thermal insulation performance.

The plurality of square tubes according to an embodiment of the present disclosure is required to have a certain thickness for assembling bolts and nuts. In order to minimize the stacking height of the battery modules, the thickness of the heat sink may be thinner than that of the plurality of square tubes in the process of forming the heat sink to be thinner.

As the thickness of the heat sink becomes thinner than the thickness of the square tube in this way, there may be a gap between the battery modules and the heat sink. Thus, to reduce the gap between the bottom of the battery module and the heat sink, the heat sink insulator 610 is arranged at the lower part of the heat sink 600, so that the heat sink 600 can be in close contact with the battery modules 210.

According to an embodiment of the present disclosure, the thickness of the heat sink 600 is 10 mm including a thermal pad, the thickness of the heat sink insulator 610 is 15 mm, and the thickness of the square tube is 25 mm. Through this, it can be seen that the space in which the thickness of the square tube is formed can be filled through the heat sink 600 and the heat sink insulator 610.

The heat sink insulator 610 may include a first heat sink insulator 611 formed in the center and second and third heat sink insulators 612 and 613 formed on both sides. The first heat sink insulator 611 may be formed between the plurality of second longitudinal square tubes 320, and the second and third heat sink insulators 612 and 613 may be formed between the plurality of second longitudinal square tubes 320 and the first longitudinal square tubes 310 at both ends.

According to an embodiment of the present disclosure, as shown in FIG. 2, the first heat sink insulator 611 may be formed between the two second longitudinal square tubes 320, and the second and third heat sink insulators 612 and 613 may be formed between a first longitudinal square tube 310 formed at both ends of the battery module stack 200 and a second longitudinal square tube 320 closest to each of the first longitudinal square tube 310.

The configuration of the heat sink insulator 610 formed at the lower part of the heat sink 600 and the first and second longitudinal square tubes 310 and 320 as shown in FIG. 2 may be similarly applied to the structure of the battery module 210 that is stacked and disposed on the upper side. However, in the structure stacked on the upper side, a third longitudinal square tube 330 may be formed at a position of the first longitudinal square tube 310, and a fourth longitudinal square tube 340 may be formed at a position of the second longitudinal square tube 320.

More specifically, as shown in FIG. 3, the first heat sink insulator 611 may be formed between the two fourth longitudinal square tubes 340, and the second and third heat sink insulators 612 and 613 may be formed between the third longitudinal square tubes 330 formed at both ends of the battery module stack 200, and the fourth longitudinal square tube 340 closest to each of the third longitudinal square tubes 330.

A tongs part 610a is formed at one end of the heat sink insulator 610 to fix a cooling water pipe described later. The arrangement structure of the heat sink insulator 610, the heat sink 600, and the first and third longitudinal square tubes 310 and 330 can also be confirmed by the cross section shown in FIG. 20.

Hereinafter, the structure of the first to fourth longitudinal square tubes according to an embodiment of the present disclosure will be described with reference mainly to FIGS. 4 to 7.

Referring to FIG. 4, the first longitudinal square tube 310 may include a connecting part 311 coupling with the connecting part 601 of the heat sink 600, first vertical square tube connecting parts 312 and 313 connected to the first vertical square tube 410, second vertical square tube connecting parts 314 and 315 connected to the second vertical square tube 420, and a support part 316 that supports the entire battery module stack 200 and at the same time, couples with the longitudinal square tube connecting part 122 of the lower case 120 shown in FIG. 22.

According to another embodiment of the present disclosure, the first longitudinal square tube 310 may include the 1-1 vertical square tube connecting parts 317 and 318 together with the first vertical square tube connecting parts 312 and 313. Through this, as shown in FIG. 12, the first vertical angle pipe 410 may be respectively coupled to the first vertical square tube connecting parts 312 and 313 as shown in FIG. 12, and the first vertical square tube 410 may be coupled with the 1-1 vertical square tube connecting parts 317 and 318 as shown in FIG. 18.

The connecting part 311 may be formed in grooves formed on both sides of the first longitudinal square tube 310, respectively. The groove is a space formed by removing two adjacent two surfaces of the square tube, and the connecting part 311 is formed on one of the two unremoved surfaces of the groove and may be coupled to the connecting part 601 of the heat sink 600 inserted into the groove. The connecting pars 311 formed on both sides may be formed in parallel.

The first vertical square tube connecting parts 312 and 313 and the 1-1 vertical square tube connecting parts 317 and 318 may be formed on the remaining surface of the groove on which the connecting part 311 is not formed. The first vertical square tube connecting parts 312 and 313 and the 1-1 vertical square tube connecting parts 317 and 318 may be formed in parallel, respectively. The first vertical square tube connecting part 312 may be formed outside the 1-1 vertical square tube connecting part 317, and the first vertical square tube connecting part 313 may also be formed outside the 1-1 vertical square tube connecting part 318.

The second vertical square tube connecting parts 314 and 315 may be formed at both ends of one surface of the first longitudinal square tube 310 and coupled to the second vertical square tube 420, respectively.

Both ends of the first longitudinal square tube 310 may be formed to be cut in the oblique direction. The oblique direction formed at one end of the first longitudinal square tube 310 and the oblique direction formed at the other end may be symmetrically formed. One surface of both ends of the first longitudinal square tube 310 may form a support part 316 which is protruded perpendicularly to the lengthwise direction of the first longitudinal square tube 310.

Referring to FIG. 5, the second longitudinal square tube 320 may include second vertical square tube connecting parts 321 and 322 connected to the second vertical square tube 420, a cut-out part 323 into which the heat sink 600 is inserted, and a support portion 324 that supports the entire battery module stack 200 and at the same time couples with the longitudinal square tube connecting part 122 of the lower case 120 shown in FIG. 22.

The second vertical square tube connecting parts 321 and 322 are formed on both ends of one side of the second longitudinal square tube 320, and may be coupled with the second vertical square tube 420 as shown in FIG. 12. The cut-out part 323 is formed in the center of the second longitudinal square tube 320, and a part of the plate-shaped heat sink 600 may be inserted into the cut-off space.

Both ends of the second longitudinal square tube 320 may be formed to be cut in the oblique direction. The oblique direction formed at one end of the second longitudinal square tube 320 and the oblique direction formed at the other end may be formed symmetrically to each other. One surface of both ends of the second longitudinal square tube 320 may form a support portion 324 which is protruded perpendicular to the lengthwise direction of the second longitudinal square tube 320.

Referring to FIG. 6, the third longitudinal square tube 330 may include a connecting part 331 coupled with the connecting part 601 of the heat sink 600, first vertical square tube connecting parts 332 and 333 connected to the first longitudinal square tube 410, and second vertical square tube connecting parts 334 and 335 connected to the second vertical square tube 420.

According to another embodiment of the present disclosure, the third longitudinal square tube 330 may include the 1-1 vertical square tube connecting parts 336 and 337 together with the first vertical square tube connecting parts 332 and 333. Through this, the first vertical square tube 410 may be coupled to the first vertical square tube connecting parts 332 and 333, respectively, as shown in FIG. 12, and the first vertical square tube 410 may be coupled to the 1-1 vertical square tube connecting parts 336 and 337 as shown in FIG. 18.

The connecting parts 331 may be formed in grooves formed on both sides of the third longitudinal square tube 330, respectively. The groove is a space formed by removing two adjacent surfaces on both sides of the square tube, and the connecting part 331 is formed on one of the two unremoved surfaces of the groove, and may be coupled to the connecting part 601 of the heat sink 600 inserted into the groove. Further, as shown in FIG. 20, it may be coupled with the BMS 700 and BDU 800 located at the uppermost part of the battery module stack 200. The connecting parts 311 formed on both sides may be formed in parallel.

The first vertical squire tube connecting parts 332 and 333 and the 1-1 vertical square tube connecting parts 336 and 337 may be formed on the remaining surface of the groove on which the connecting part 331 is not formed. The first vertical square tube connecting parts 332 and 333 and the 1-1 vertical square tube connecting parts 336 and 337 may be formed in parallel, respectively. The first vertical square tube connecting part 332 may be formed outside the 1-1 vertical square connecting part 336, and the first vertical square tube connecting part 333 may also be formed outside the second vertical square tube connecting part 337.

The second vertical square tube connecting portions 334 and 335 are formed on both ends of one surface of the third longitudinal square tube 330 and may be coupled to the second vertical square tube 420, respectively.

Both ends of the third longitudinal square tube 330 may be formed to be cut in an oblique direction. The oblique direction formed at one end of the third vertical square tube 330 and the oblique direction formed at the other end may be formed symmetrically to each other.

Referring to FIG. 7, the fourth longitudinal square tube 340 may include second vertical square tube connecting parts 341 and 342 connected to the second vertical longitudinal square tube 420, and a cut-out part 343 into which the heat sink 600 is inserted.

The second vertical square tube connecting parts 341 and 342 are formed on both ends of one surface of the fourth longitudinal square tube 340, and may be coupled with the second vertical square tube 420 as shown in FIG. 12. The cut-out part 343 is formed in the center of the fourth longitudinal square tube 340, and a part of the plate-shaped heat sink 600 may be inserted in the cut-out space.

Both ends of the fourth longitudinal square tube 340 may be formed to be cut in the oblique direction. The oblique direction formed at one end of the fourth longitudinal square tube 340 and the oblique direction formed at the other end may be formed symmetrically with each other.

Hereinafter, the structure and arrangement of the vertical square tube according to an embodiment of the present disclosure will be described with reference to FIGS. 9 to 12.

FIG. 9 is a view illustrating the configuration of FIG. 8 and a plurality of vertical square tubes according to an embodiment of the present disclosure. FIG. 10 is a top view (a), a perspective view (b), and a side view (c) of a first vertical angle tube according to an embodiment of the present disclosure. FIG. 11 is a top view (a), a perspective view (b), and a side view (c) of a second vertical angle tube according to an embodiment of the present disclosure. FIG. 12 is a view illustrating a state in which a plurality of vertical square tubes are coupled to the battery module stack of FIG. 9.

First, the configuration and arrangement of the vertical square tube according to an embodiment of the present disclosure will be described with reference mainly to FIGS. 9 and 12.

Referring to FIGS. 9 and 12, a plurality of vertical square tube 400 according to an embodiment of the present disclosure are formed in the vertical direction of the stacked battery modules 210, and are mounted on the battery module stack 200, and coupled with all parts of the stacked longitudinal square tubes 300 located on a plurality of axes in the vertical direction among the stacked longitudinal square tubes 300, in the four-direction outer periphery of the battery module stack 200.

The battery module stack 200 and the plurality of longitudinal square tube 400 for fixing the plurality of longitudinal square tubes 300 formed on the battery module stack 200 may include a plurality of first vertical square tubes that are all coupled to one of the first longitudinal square tubes 310 and a plurality of third longitudinal square tubes 330 located on the same vertical axis as one of the plurality of first longitudinal square tubes 310, and a plurality of second vertical square tubes, all of which are all coupled with one of the second vertical pipes 320, and a plurality of second vertical square tubes 420, all of which are coupled with the plurality of fourth longitudinal square tubes 340 located on the same vertical axis as one of the plurality of second longitudinal square tubes 320.

The first vertical square tube 410 may be integrally coupled with one of the plurality of first longitudinal square tubes 310 and the plurality of third longitudinal square tubes 330 located on the same vertical axis as one of the plurality of first longitudinal square tubes 310.

The first vertical square tube 410 has a plurality of longitudinal square tube connecting parts formed on one side, and the plurality of longitudinal square tube connecting parts may be coupled with first vertical square tube connecting parts 312 and 313 formed on one of the plurality of first longitudinal square tubes 310, and first vertical square tube connecting parts 332 and 333 formed on a plurality of third longitudinal square tubes 330 located on the same vertical axis as one of the plurality of first longitudinal square tube.

According to an embodiment of the present disclosure, as illustrated in FIGS. 9 and 12, the first vertical square tubes 410 may be formed in the front and rear directions of the battery modules 210, respectively. In more detail, the first vertical square tube 410 may be formed two by two on front and rear sides of the battery modules 210.

According to an embodiment of the present disclosure, one of the first vertical square tubes 410 on one side can be integrally coupled with the first vertical square tube connecting part 312 formed on the first longitudinal square tube 310 at the lower part on one side, and four first vertical square tube connecting parts 332 formed on the third longitudinal square tubes 330 at the upper part on one side. At this time, the first vertical square tube connecting part 312 and the four first vertical square tube connecting parts 332 are located on the same axis in the vertical direction, so that the first vertical square tube 410 formed in a straight shape is integrally coupled with each connecting part.

In addition, according to an embodiment of the present disclosure, one of the first vertical square tube 410 at the lower part on one side may be integrally coupled with a first vertical square tube connecting part 313 formed on the first longitudinal square tube 310 at the upper part on one side, and four first vertical square tube connecting parts 333 formed on the third longitudinal square tubes 330 on one side. At this time, the first vertical square tube connecting part 313 and the four first vertical square tube connecting parts 333 are located on the same axis in the vertical direction, so that the first vertical square tube 410 formed in a straight shape can be integrally coupled with the respective connecting parts.

In addition, according to another embodiment of the present disclosure, as shown in FIG. 18, one of the first vertical square tubes 410 at the lower part on one side may be integrally coupled with the 1-1 vertical square tube connecting part 317 formed on the first longitudinal square tube 310 at the upper part on one side, and four first vertical square tube connecting parts 336 formed on the third longitudinal square tubes 330 on one side. At this time, the first vertical square tube connecting part 317 and the four first vertical square tube connecting parts 336 are located on the same axis in the vertical direction, so that the first vertical square tube 410 formed in a straight shape can be integrally coupled with the respective connecting parts.

Further, according to another embodiment of the present disclosure, as shown in FIG. 18, one of the first vertical square tubes 410 at the lower end on one side may be integrally coupled with the 1-1 vertical square tube connecting part 318 formed in the first longitudinal square tube 310 at the upper end on one side and the third longitudinal square tube 330 on one side, and the four first vertical square tube connecting parts 337. At this time, the first vertical square tube connecting part 318 and the four first vertical square tube connecting parts 337 are located on the same axis in the vertical direction, and the first vertical square tubes 410 formed in a straight shape may be integrally coupled with the respective connecting parts.

The second vertical square tube 420 can be coupled with one of the a plurality of fourth longitudinal square tubes 340 and the third longitudinal square tube 330 located on the same vertical axis as one of the plurality of second vertical longitudinal square tube 320 and one of the plurality of second longitudinal square tube 320.

The second vertical square tube 420 has a plurality of longitudinal square tube connecting parts formed on one side, and the plurality of longitudinal square tube connecting parts can be coupled with the second vertical square tube connecting parts 321 322 formed on one of the plurality of second longitudinal square tubes 320, the second vertical square tube connecting parts 341 and 342 formed on a plurality of fourth longitudinal square tubes 340 located on the same vertical axis as one of the plurality of fourth longitudinal square tubes, and the second vertical square tube connecting part is 334 and 335 formed on one of the plurality of third longitudinal square tubes 330.

According to an embodiment of the present disclosure, as shown in FIGS. 9 and 12, the second vertical square tubes 420 may be formed in the left and right directions of the battery modules 210, respectively. In more detail, the second vertical square tubes 420 may be formed four by four on the left and right sides of the battery modules 210, respectively.

According to an embodiment of the present disclosure, one of the second vertical square tubes 420 on one side may be integrally coupled with the second vertical square tube connecting part 321 formed on the second longitudinal square tube 320 at the lowermost part on one side, the three second vertical square tube connecting parts 341 formed on the fourth longitudinal square tubes 340 in the center of one side, and the second vertical square tube connecting parts 334 formed on the third longitudinal square tube 330 on the uppermost part on one side. At this time, the second vertical square tube connecting part 321, the three second vertical square tube connecting part 341 and the second vertical square tube connecting part 334 are located on the same axis in the vertical direction, so that the second vertical square tubes 420 formed in a straight shape may be integrally coupled with the respective connecting parts.

According to an embodiment of the present disclosure, one of the second vertical square tubes 420 on one side can be integrally coupled with the second vertical square tube connecting part 322 formed on the second longitudinal square tube 320 at the lowermost part on one side, the second vertical square tube connecting parts 342 formed on the fourth vertical square tubes 340 in the center of one side, and the second vertical square tube connecting parts 335 formed on the third longitudinal square tube 330 at the uppermost part on one side. At this time, the second vertical square tube connecting part 322, the three second vertical square tube connecting parts 342, and the second vertical square tube connecting parts 335 are located on the same axis in the vertical direction, so that a second vertical square tube 420 formed in a straight shape can be integrally coupled with the respective connecting parts.

According to an embodiment of the present disclosure, one of the second vertical square tubes 420 on one side can be integrally coupled with the second vertical square tube connecting part 314 formed on the first vertical angle pipe 310 at the lower part on one side and the four second vertical square tube connecting parts 334 formed on the third longitudinal square tubes 330 at the upper part on one side. At this time, the second vertical square tube connecting part 314 and the four second vertical square tube connecting parts 334 are located on the same axis in the vertical direction, sot that the second vertical square tubes 420 formed in a straight shape may be integrally coupled with the respective connecting parts.

According to an embodiment of the present disclosure, one of the second vertical square tubes 420 on one side can be integrally coupled with the second vertical square tube connecting part 315 formed on the first vertical longitudinal square tube 310 at the lower part on one side and the four second vertical square tube connecting parts 335 formed on the third longitudinal square tubes 330 at the upper part on one side. At this time, the second vertical square tube connecting part 315 and the four second vertical square tube connecting parts 335 are located on the same axis in the vertical direction, so that the second vertical square tubes 420 formed in a straight shape may be integrally coupled with the respective connecting parts.

Hereinafter, the vertical square tube 400 according to an embodiment of the present disclosure will be described with reference mainly to FIGS. 10 and 11.

Referring to FIG. 10, the first vertical square tube 410 may include a longitudinal square tube connecting part 411 connected to a longitudinal square tube 300. According to an embodiment of the present disclosure, the battery modules 210 are stacked in five stages, and the longitudinal square tube connecting part 411 is also formed in five stages at regular intervals, so that it can be coupled with each of the first or third longitudinal square tubes 310 and 330 disposed at the position corresponding to each position.

More specifically, the longitudinal square tube connecting part 411a formed at one end may be coupled with the first vertical square tube connecting parts 312 and 313 formed in the first longitudinal square tube 310 or the 1-1 vertical square tube connecting parts 317 and 318. Further, the longitudinal square tube connecting part (411b) excluding the longitudinal square tube connection part 411a formed at one end can be coupled with the first vertical square tube connecting parts 332 and 333 formed on the third longitudinal square tube 330 or the 1-1 vertical square tube connecting parts 336 and 337.

Referring to FIG. 11, the second vertical square tube 420 may include a longitudinal square tube connecting part 421 connected to a longitudinal square tube 300, a horizontal square tube connecting part 422 connected to a horizontal square tube described later, and a bracket connecting part 423 for coupling with a bracket that connects the lower case and the battery module stack 200, which will be described later.

According to an embodiment of the present disclosure concerning the longitudinal square tube connecting part 421, the battery modules 210 are stacked in five stages. The longitudinal square tube connecting part 421 is also formed in five at regular intervals, and can be integrally coupled with the connecting parts formed in the second, fourth, or third longitudinal square tubes 320, 340, and 330 arranged at the position corresponding to each position.

More specifically, the longitudinal square tube connecting part 421a formed at one end may be coupled to the second longitudinal square tube connecting parts 321 and 322 formed on the longitudinal square tube 320. Further, the longitudinal square tube connecting part 421b formed at the other end may be coupled to the second vertical square tube connecting parts 334 and 335 formed on the third longitudinal square tube 330. In addition, the longitudinal square tube connecting part 421c formed in the center may be coupled to the second vertical square tube connecting parts 341 and 342 formed in the fourth longitudinal square tube 340.

Hereinafter, the structure and arrangement of the horizontal square tube according to an embodiment of the present disclosure will be described with reference mainly to FIGS. 13 to 15.

FIG. 13 is a view illustrating the configuration of FIG. 12 and horizontal square tubes according to an embodiment of the present disclosure. FIG. 14 is a top view (a), a perspective view (b), and a side view (c) of horizontal square tubes according to an embodiment of the present disclosure. FIG. 15 is a view illustrating a state in which a plurality of horizontal square tubes are coupled to the battery module stack of FIG. 12.

Referring to FIGS. 13 to 15, the horizontal square tubes 500 according to an embodiment of the present disclosure are formed in the front and rear directions of the stacked battery modules, and mounted on the battery module stack 200, and coupled with all the part of each of the vertical square tubes 400 located on a plurality of axes in the front and rear directions among the plurality of vertical square tubes 400, in the outside of each of the plurality of vertical square tubes 400.

The plurality of horizontal square tubes 500 may be coupled with a plurality of second vertical square tubes 420 located on the same axis in the front and rear directions. A plurality of vertical square tube connecting parts 501 are formed in the horizontal square tube 500. The plurality of vertical square connecting parts 501 may be coupled to the horizontal square tube connecting parts 422 formed on the plurality of second vertical square tubes 400.

According to an embodiment of the present disclosure, the horizontal square tube 500 may be disposed one by one at each of the left and right sides of the battery module. Each of the horizontal square tubes 500 may be integrally coupled with the connecting parts 422 located at the uppermost part of the horizontal square tube connecting parts 422 formed in each of the second vertical square tubes 420.

Referring to FIGS. 14 and 17, the vertical square tube connecting part 501 may be formed two by two in the center and one by one at both ends. Therefore, the two vertical square tube connecting parts 501a disposed in the center are coupled with the two connecting parts 422 located at the uppermost part of the two second vertical square tubes 420 located in the center of the battery module stack 200, and the two vertical square tube connecting parts 501b disposed at both ends may be coupled to the two connecting parts 422 located at the uppermost part of the second vertical square tubes 420 located at both ends of the battery module stack 200.

As shown in FIG. 15, in the water-cooled battery module structure according to the present disclosure, the cooling water pipe 900 may be formed on one surface of the battery module stack 200 so as to supply cooling water to the heat sink 600. The cooling water pipe 900 may be fixed to one surface of the battery module stack 200 through the tongs 610a formed on one side of the heat sink insulator 610.

Hereinafter, the overall configurations and effects of each of the aforementioned square tubes will be described with reference to the figures according to the present disclosure.

The coupling between the above-described vertical square tube 300, the vertical square tube 400, and the horizontal square tube 500 is made through a connecting part formed in each of the tubes. According to an embodiment of the present disclosure, the coupling of the respective connecting parts may be achieved through bolt-nut fastening. At the time of mutual fastening, each tube needs hole drilling, nut welding, back cutting-out for access to welding tools, bracket welding attachment, etc. Thereby, the final shape type can be classified.

In the respective square tubes, the first to fourth longitudinal square tubes 310, 320, 330 and 340 are arranged in the left and right directions based on the battery module, the first and second vertical square tubes 410 and 420 are arranged vertically in the front-back and up-down directions based on the battery module, the horizontal square tubes 500 are arranged in the front and rear directions based on the battery module, so that a horizontal-vertical-height lattice structure is formed on the outer periphery of the battery modules 210 around the battery modules 210, thereby constraining six degrees of freedom of the battery modules 210.

The longitudinal square tube 300, the vertical square tube 400 and the horizontal square tube 500 according to an embodiment of the present disclosure are mechanically fixed and pressure-resistant rigid structures of the battery modules 210. As shown in the figures of the respective square tubes, steel square tube with a square cross section can be used. The square tube has dimensions of 20 to 40 mm in width and 20 to 40 mm in length, which may be a value considering the bolt-nut assembly surface used when assembling the vehicle parts of the battery pack.

The square tube may have a thickness of 1.0 mm to 3.0 mm. The cross-sections of the square tubes shown in FIGS. 4 to 7, 10, 11, and 14 may be formed to have a width of 40 mm, a length of 25 mm, and a thickness of 2 mm. As described above, although there are some modifications of the connecting part, the cut-out part, the support part, etc. in the square tubes, the cross-sectional outer size of each of the seven types of square tubes is the same, and thus, the cross-section of respective square tubes is simplified as much as possible, so that price competitiveness of parts can be secured.

According to the present disclosure, in a single section, the fixed structure design of the battery module stack 200 is completed with only total seven types of square tubes of the first longitudinal square tube 310, the second longitudinal square tube 320, the third longitudinal square tube 330, the fourth longitudinal square tube 340, the first vertical square tube 410, the second vertical square tube 420 and the horizontal square tub 500, and brackets 130, so that the components are simple and price competitiveness can be secured.

Further, as the square tubes are disposed more outside than the outside of the battery modules, the square tubes coupled to each other at the time of crimping the battery module stack 200 receives a load first, so that a force transmitted to the battery modules due to the high stiffness of the square tubes is lowered, thereby improving crimping stability.

In addition, compared to a structure in which modules stacked in multiple layers are fixed by bonding between press plate structures, the weight specific stiffness of the square tubes according to an embodiment of the present disclosure is excellent, and a relatively lightweight battery pack can be manufactured.

Hereinafter, a battery module stack in which BMS and BDU are combined according to an embodiment of the present disclosure will be described with reference to FIGS. 16 to 20.

FIG. 16 is a view illustrating a state in which BMS and BDU are coupled to a battery module stack according to an embodiment of the present disclosure. FIG. 17 is a front view of FIG. 16. FIG. 18 is a rear view of FIG. 16. FIG. 19 is a top view of FIG. 16. FIG. 20 is a cross-sectional view illustrating a portion A-A' of FIG. 19.

Referring to FIGS. 16 to 20, a BMS 700 and a BDU 800 may be coupled to the top of the battery module stack 200 of the present disclosure.

The BMS 700 refers to a battery management system (BMS), and serves to manage the temperature or voltage of battery modules. The BDU 800 refers to a battery disconnect unit, and serves to control electrical connection of battery modules.

Referring to FIG. 16, the BMS 700 and the BDU 800 may be arranged side by side on the upper part of the battery module stack 200. Referring to FIG. 17, the BMS 700 and the BDU 800 may be arranged between the third longitudinal square tubes 330 disposed at the uppermost part of the battery module stack 200.

According to an embodiment of the present disclosure, the BMS 700 and the BDU 800 may be coupled with the third longitudinal square tubes 330 disposed at the uppermost part of the battery module stack 200. More specifically, as shown in FIG. 19, the four connecting parts 701 formed on the side of the BMS 700, and the four connecting parts 801 formed on the side surfaces of the BDU 800 are coupled with the connecting parts 331 formed in the third longitudinal square tubes 330, respectively, so that the BMS 700 and the BDU 800 may be coupled to the battery module stack 200.

According to an embodiment of the present disclosure, the connecting parts 701 of the BMS 700 and the connecting parts 331 of the third longitudinal square tube 330 may be coupled with a bolt 702. The connecting part 801 of the BDU 800 and the connecting part 331 of the third longitudinal square tube 330 may be similarly coupled with a bolt 802. However, the combination method is not limited thereto, and the BMS 700 and the BDU 800 may be fixed to the battery module stack 200 through various coupling methods.

Hereinafter, the case mounting structure of a bracket and a module stack including a battery according to an embodiment of the present disclosure will be described with reference to FIGS. 21 to 23.

FIG. 21 is a view illustrating a battery module stack, upper and lower cases, and brackets according to an embodiment of the present disclosure. FIG. 22 is a view illustrating a lower case according to an embodiment of the present disclosure. FIG. 23 is a view illustrating a state in which the upper and lower cases are assembled according to an embodiment of the present disclosure.

Referring to FIGS. 21 to 23, the battery module stack 200 according to an embodiment of the present disclosure may be mounted inside the upper case 110 and the lower case 120 to physically and chemically protect the battery modules 210 from the outside.

The battery module stack 200 may be coupled to the lower case 120 via the bracket 130 shown in FIG. 21. The bracket 130 includes first brackets 131 formed on the left side of the battery module and second brackets 132 formed on the right side of the battery module. According to an embodiment of the present disclosure, each of the first and second brackets 131 and 132 may be formed of four, and is disposed four by four on the left and right sides of the battery module stack 200, so that the battery module stack 200 can be fixed to the lower case 120.

One end of the bracket 130 may be coupled to the bracket connecting part 121 formed on the lower case 120. According to an embodiment of the present disclosure, a first bracket connecting part 121a formed in four is formed on one side of the upper end of the lower case 120, and the four first bracket connecting parts 121*a* may be respectively coupled to the four first brackets 131. Further, a second bracket connecting part 121*b* formed in four is formed on the other side of the upper end of the lower case 120, and the four second bracket connecting parts 121*b* may be coupled to the four second brackets 132, respectively.

The other end of the bracket 130 may be coupled to the bracket connecting part 423 of the second vertical square tube 420. According to an embodiment of the present disclosure, the four second vertical square tubes 420 are formed on the left side of the battery module stack 200, and the bracket connecting parts 423 formed on each of the four second vertical square tubes 420 may be coupled to the other ends of the four first brackets 131, respectively. Further, four second vertical square tubes 420 are formed on the right side of the battery module stack 200, and bracket connecting parts 423 formed on each of the four second vertical square tubes 420 may be coupled to the other ends of the four second brackets 132, respectively.

The longitudinal square tube connecting part 122 may be formed at the lower part of the lower case 120. According to an embodiment of the present disclosure, the support parts 316 formed at both ends of the first longitudinal square tubes 310 disposed at both ends of the lowermost part of the battery module stack 200 can be coupled with the four longitudinal square tube connecting parts 122*a* disposed two by two at each end of the lower case 120. Further, the support parts 324 formed at both ends of the second longitudinal square tubes 320 disposed in the center of the lowermost part of the battery module stack 200 can be coupled with the four longitudinal square tube connecting part 122*b* arranged two by two at each end of the lower case 120.

The bracket connection part 423 may be formed in the middle of each second vertical square tube, and the bracket 130 coupled to the bracket connecting part 423 are located at an intermediate height of the battery module stack 200 to effectively suppress the flow of the battery module stack 200 having a high center of gravity.

Hereinafter, a method of manufacturing a battery pack according to an embodiment of the present disclosure will be described with reference to FIGS. 8, 12, and 15.

FIG. 8 is a view illustrating a state in which longitudinal square tubes are coupled to the battery module stack according to an embodiment of the present disclosure. FIG. 12 is a view illustrating a state in which a plurality of vertical square tubes are coupled to the battery module stack of FIG. 9. FIG. 15 is a view illustrating a state in which a plurality of horizontal square tubes are coupled to the battery module stack of FIG. 12.

A method for manufacturing a battery pack according to an embodiment of the present disclosure sequentially performs the steps of: stacking and arranging a plurality of longitudinal square tubes 300 mounted on the battery module stack 200 in a vertical direction between the stacked battery modules 210 so as to be coupled integrally with the battery modules 210 formed in the left and right directions at the uppermost part and the lowermost part; coupling a plurality of vertical square tubes 400 with all of the longitudinal square tubes 300 respectively located on a plurality of longitudinal axes of the stacked longitudinal square tubes 300 in the four-direction outer periphery of the battery module stack 120; and in the outside of the plurality of vertical square tubes, coupling a plurality of horizontal square tubes 500 with all of the parts of the vertical pipes 400 respectively located on a plurality of axes in the front and rear directions among the plurality of vertical square tubes 400.

A state in which the plurality of longitudinal square tubes 300 are arranged can be confirmed in FIG. 8. As shown in FIG. 8, as the battery modules 210 are stacked upward, a plurality of vertical square tubes 300 may be stacked and disposed to correspond to each battery module 210.

A state in which the plurality of vertical square tubes 400 are arranged can be confirmed through FIG. 12. As shown in FIG. 12, a plurality of longitudinal square tubes 400 may be arranged to be connected to a plurality of longitudinal square tubes 300 in the vertical direction to fix the plurality of vertical square tubes 400.

A state in which the plurality of horizontal square tubes 500 are arranged can be confirmed through FIG. 15. As shown in FIG. 15, a plurality of horizontal square tubes 500 are arranged to be connected to a plurality of vertical square tubes 400 in the front and rear direction, a plurality of longitudinal square tubes 300 and a plurality of vertical square tubes 400 can be fixed.

According to an embodiment of the present disclosure, after the step of combining the plurality of horizontal square tubes 500, the battery module stack 200 is attached to the lower case 120 through the bracket 130 as shown in FIG. The step of fixing and coupling the upper case 110 to the lower case 120 as shown in FIG. 23 may be further included.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims.

Further, these modified embodiments should not be understood individually from the technical spirit or perspective of the present disclosure.

DESCRIPTION OF REFERENCE NUMERALS

110: upper case
120: lower case
121: bracket connecting part
122: longitudinal square tube connecting part
130: bracket
131: first bracket
132: second bracket
210: battery module
200: battery module stack
300: longitudinal square tube
310: first longitudinal square tube
311: connecting part
312, 313: first vertical square tube connecting part
314, 315: second vertical square tube connecting part
317, 318: 1-1 vertical square tube connecting part
316: support part
320: second longitudinal square tube
321, 322: second vertical square tube connecting part
323: cut-out part
324: support part
330: third longitudinal square tube 331: connecting part
332, 333: first vertical square tube connecting part
334, 335: second vertical square tube connecting part
336, 337: 1-1 vertical square tube connecting part
340: fourth longitudinal square tube
341, 342: vertical square tube connecting part
343: cut-out part
400: vertical square tube
410: first vertical square tube
411: longitudinal square tube connecting part
420: second vertical square tube
421: longitudinal square tube connecting part
422: horizontal square tube connecting part
423: bracket connecting part
500: horizontal square tube
501: vertical square tube connecting part
600: heat sink
610: heat sink insulator
610a: tongs part
611: first heat sink insulator
612, 613: second, third heat sink insulator
700: BMS
701: connecting part
800: BDU
801: connecting part
900: cooling water pipe

The invention claimed is:

1. A battery pack comprising:
an upper case and a lower case;
a battery module stack in which battery modules are stacked between the upper case and the lower case;
a longitudinal square tube formed in left and right directions of the stacked battery modules and mounted on the battery module stack;
a vertical square tube formed in a vertical direction of the stacked battery modules and mounted on the battery module stack; and
a horizontal square tube formed in front and rear directions of the stacked battery modules and mounted on the battery module stack,
wherein the longitudinal square tube is formed of a plurality of tubes, and the plurality of longitudinal square tubes are stacked and arranged in the vertical direction between the stacked battery modules so as to be coupled with all of the battery modules formed in the left and right directions at an uppermost part and a lowermost part of the stacked battery modules,
wherein the vertical square tube is formed of a plurality of tubes, and the plurality of vertical square tubes are coupled to parts of the longitudinal square tubes respectively located on a plurality of axes of stacked vertical square tubes among stacked longitudinal square tubes in four-direction outer periphery of the battery module stack,
wherein the horizontal square tube is formed of a plurality of tubes, and the plurality of horizontal square tubes are coupled to parts of each of the vertical square tubes respectively located on a plurality of axes of the plurality of vertical square tubes, from outside of the plurality of vertical square tubes,
wherein at least one tube of the plurality of tubes of the longitudinal square tube is arranged in the left and right directions that intersects a lengthwise direction of the battery modules, and the at least one tube is arranged across a middle portion of the battery modules, and
wherein at least one tube of the plurality of tubes of the vertical square tube is directly connected to the at least one tube of the plurality of tubes of the longitudinal square tube at the middle portion of the battery modules.

2. The battery pack according to claim 1, wherein the plurality of longitudinal square tubes comprise,
a plurality of first longitudinal square tubes formed at opposite ends of the lowermost of the stacked battery modules;
at least one second longitudinal square tube formed between the plurality of first longitudinal square tubes at the lowermost part of the stacked battery modules;
a plurality of third longitudinal square tubes formed at opposite ends of a plurality of longitudinal square tubes formed between the uppermost part of the stacked battery modules and the stacked battery modules; and
at least one fourth longitudinal square tube formed between the plurality of third longitudinal square tubes excluding the plurality of third longitudinal square tubes formed on the uppermost part of the stacked battery modules.

3. The battery pack according to claim 2, further comprising:
a heat sink formed between adjacent battery modules and the plurality of longitudinal square tubes, and
a heat sink insulator that is arranged between the heat sink and a battery module located below the heat sink so that the heat sink is in close contact with the battery module.

4. The battery pack according to claim 3, wherein the plurality of first longitudinal square tubes and the plurality of third longitudinal square tubes are coupled to the heat sink.

5. The battery pack according to claim 4, wherein connecting parts are formed on opposite sides of the plurality of first longitudinal square tubes and the plurality of third longitudinal square tubes, and the plurality of first longitudinal square tubes or the plurality of third longitudinal square tubes are coupled to the heat sink via the connecting parts.

6. The battery pack according to claim 3, wherein the at least one second longitudinal square tube and the at least one fourth longitudinal square tube have a cut-out part formed therein, and the heat sink is inserted into the cut-out part.

7. The battery pack according to claim 3, wherein the heat sink insulator comprises,
a first heat sink insulator located at a center of the heat sink insulator; and
second and third heat sink insulators located on opposite sides of the heat sink insulator,
the at least one second longitudinal square tube includes a plurality of tubes,
the at least one fourth longitudinal square tubes includes a plurality of tubes,
the first heat sink insulator is formed between the plurality of second longitudinal square tubes and between the plurality of fourth longitudinal square tubes, and
the second and third heat sink insulators are formed between the first longitudinal square tubes at opposite ends and the second longitudinal square tubes closest to each other, and between the third vertical square tube at opposite ends and the fourth longitudinal square tubes closest to each other.

8. The battery pack according to claim 3, further comprising a cooling water pipe for supplying cooling water to the heat sink,
wherein the cooling water pipe is formed on one surface of the battery module stack.

9. The battery pack according to claim 8, wherein a tongs part is formed on one side of the heat sink insulator, and the cooling water pipe is fixed through the tongs part.

10. The battery pack according to claim 2, wherein a support portion supporting the battery module stack and coupled to the lower case is formed in the plurality of first longitudinal square tubes and the at least one second longitudinal square tube.

11. The battery pack according to claim 2, wherein the plurality of vertical square tubes comprise,
a plurality of first vertical square tubes which are coupled to one of the plurality of first longitudinal square tubes, and the plurality of third longitudinal square tubes located on the same vertical axis as one of the plurality of first longitudinal square tubes; and
a plurality of second vertical square tubes which are coupled to one of a plurality of second longitudinal square tubes, and one of a plurality of fourth longitudinal square tubes and the third longitudinal square tubes located on the same vertical axis as one of the plurality of second longitudinal square tubes.

12. The battery pack according to claim 11, wherein a plurality of longitudinal square tube connecting parts are formed on one side of the first vertical square tubes, and
the plurality of longitudinal square tube connecting parts are coupled to a first vertical square tube connecting part formed on one of the plurality of first longitudinal square tubes, and a first vertical square tube connecting part formed on the plurality of third longitudinal square tubes located on the same vertical axis as one of the plurality of first longitudinal square tubes.

13. The battery pack according to claim 11, wherein a plurality of longitudinal square tube connecting parts are formed on one side of the second vertical square tubes, and
the plurality of longitudinal square tube connecting parts are coupled to a second vertical square tube connecting part formed on one of the plurality of second longitudinal square tubes, a second vertical square tube connecting part formed on the plurality of fourth longitudinal square tubes located on the same vertical axis as one of the plurality of fourth longitudinal square tubes, and a second vertical square tube connecting part formed on one of the plurality of third longitudinal square tubes.

14. The battery pack according to claim 2, wherein the plurality of vertical square tubes comprise a plurality of second vertical square tubes that are coupled to one of the plurality of first longitudinal square tubes, and a plurality of third longitudinal square tubes located on the same vertical axis as one of the plurality of first longitudinal square tubes,
a plurality of longitudinal square tube connecting parts are formed on one side of the second vertical square tube, and
the plurality of longitudinal square tube connecting parts are coupled to a second vertical square tube connecting part formed on one of the plurality of first longitudinal square tubes, and a second vertical square tube connecting parts formed on the plurality of third longitudinal square tubes located on the same vertical axis as one of the plurality of first longitudinal square tubes.

15. The battery pack according to claim 14, wherein the plurality of horizontal square tubes are coupled to the plurality of second longitudinal square tubes located coaxially in the front and rear directions.

16. The battery pack according to claim 15, wherein a plurality of vertical square tube connecting parts are formed in the plurality of horizontal square tubes, and the plurality of vertical square tube connecting parts are coupled to a horizontal square tube connecting part is formed in the plurality of second vertical square tubes.

17. The battery pack according to claim 1, further comprising a plurality of brackets fixing the battery module stack to the lower case.

18. A device comprising the battery pack according to claim 1.

19. A method for manufacturing a battery pack, the method comprising:
stacking and arranging a plurality of longitudinal square tubes mounted on a battery module stack in a vertical direction between stacked battery modules so as to be coupled integrally with the stacked battery modules formed in left and right directions at an uppermost part and a lowermost part of the battery module stack;
coupling a plurality of vertical square tubes with the longitudinal square tubes respectively located on a plurality of longitudinal axes of the stacked longitudinal square tubes in a four-direction outer periphery of the battery module stack; and
in the outside of the plurality of vertical square tubes, coupling a plurality of horizontal square tubes with parts of the plurality of vertical square tubes respectively located on a plurality of axes in front and rear directions among the plurality of vertical square tubes,
wherein at least one tube of the plurality of longitudinal square tubes is arranged in the left and right directions that intersect a l lengthwise direction of the stacked battery modules, and the at least one tube is arranged across a middle portion of the stacked battery modules, and
wherein at least one tube of the plurality of vertical square tube is directly connected to the at least one tube of the plurality of longitudinal square tube at the middle portion of the stacked battery modules.

20. The method for manufacturing a battery pack according to claim 19, further comprising fixing the battery module stack to a lower case through a bracket and coupling an upper case to the lower case, after the coupling of the plurality of horizontal square tubes.

* * * * *